US012439165B2

(12) United States Patent
Walia et al.

(10) Patent No.: US 12,439,165 B2
(45) Date of Patent: Oct. 7, 2025

(54) SYSTEMS AND METHODS FOR DATA STORAGE AND PROCESSING

(71) Applicant: Royal Melbourne Institute of Technology, Melbourne (AU)

(72) Inventors: Sumeet Walia, Melbourne (AU); Sharath Sriram, Melbourne (AU); Madhu Bhaskaran, Melbourne (AU); Taimur Ahmed, Melbourne (AU)

(73) Assignee: Royal Melbourne Institute of Technology, Melbourne (AU)

( * ) Notice: Subject to any disclaimer, the term of this patent is extended or adjusted under 35 U.S.C. 154(b) by 17 days.

(21) Appl. No.: 18/195,883

(22) Filed: May 10, 2023

(65) Prior Publication Data
US 2023/0283908 A1 Sep. 7, 2023

Related U.S. Application Data

(63) Continuation of application No. PCT/AU2021/051331, filed on Nov. 10, 2021.

(30) Foreign Application Priority Data

Nov. 10, 2020 (AU) ................................ 2020904109

(51) Int. Cl.
*H04N 23/73* (2023.01)
*G02B 5/20* (2006.01)
(Continued)

(52) U.S. Cl.
CPC ............ *H04N 23/73* (2023.01); *H04N 23/11* (2023.01); *H04N 23/667* (2023.01); *H10F 30/10* (2025.01); *G02B 5/208* (2013.01)

(58) Field of Classification Search
CPC ...... H04N 23/73; H04N 23/11; H04N 23/667; H04N 23/60; H01L 31/09; H01L 27/146; H01L 31/14; G02B 5/208
See application file for complete search history.

(56) References Cited

U.S. PATENT DOCUMENTS

2017/0013210 A1 1/2017 Hsu
2019/0306391 A1 10/2019 Von Cramon

FOREIGN PATENT DOCUMENTS

CN 111355901 6/2020
WO 2018234215 A1 12/2018
(Continued)

OTHER PUBLICATIONS

Australian Patent Office, International Search Report for International Application No. PCT/AU2021/051331, dated Feb. 3, 2022, 9 pages.
(Continued)

*Primary Examiner* — Sinh Tran
*Assistant Examiner* — Angel L Garces-Rivera

(57) ABSTRACT

An imaging device described herein for capturing image data comprises an optical sensor responsive to electromagnetic radiation, wherein the sensor exhibits a photo-memory effect causing the sensor to act as a short-term memory device; an exposure control device configured to adopt a first mode, wherein electromagnetic radiation reaches the sensor and a second mode, wherein electromagnetic radiation is restricted from reaching the sensor; a processor configured to receive sensor data from the sensor, and to cause the exposure control device to selectively adopt the first mode and the second mode; and a long term memory device accessible to the processor, wherein the processor is configured to read executable instructions from the long term memory and to write sensor data to the long term memory. Data stored in the sensor acting as a short-term memory device is erasable by exposing the photo-sensor to electromagnetic radiation.

20 Claims, 14 Drawing Sheets

(51) Int. Cl.
*H04N 23/11* (2023.01)
*H04N 23/667* (2023.01)
*H10F 30/10* (2025.01)

(56) References Cited

FOREIGN PATENT DOCUMENTS

| WO | 2020000037 A1 | 1/2020 |
|---|---|---|
| WO | 2022099363 A1 | 5/2022 |

OTHER PUBLICATIONS

Australian Patent Office, Written Opinion for International Application No. PCT/AU2021/051331, dated Feb. 3, 2022, 8 pages.

Zhou, F. et al, "2D Materials Based Optoelectronic Memory: Convergence of Electronic Memory and Optical Sensor", Department of Applied Physics, The Hong Kong Polytechnic University, Hong Kong, Research, Published Aug. 21, 2019. <https://www.researchgate.net/publication/335357127_2D_Materials_Based_Optoelectronic_Memory_Convergence_of_Electronic_Memory_and_Optical_Sensor>.

Yan, F. et al, "Toward High-Performance Photodetectors Based on 2D Materials: Strategy on Methods", Small Methods, published Nov. 2017. <https://www.researchgate.net/publication/324018499_Toward_High-Performance_Photodetectors_Based_on_2D_Materials_Strategy_on_Methods>.

Tan, H. et al, "Switching Memory: An Optoelectronic Resistive Switching Memory with Integrated Demodulating and Arithmetic Functions", DOI: 10.1002/adma.201500039, Adv. Mater. 2015, 27, 2797-2803, published 2015. <https://www.researchgate.net/publication/273783326_Switching_Memory_An_Optoelectronic_Resistive_Switching_Memory_with_Integrated_Demodulating_and_Arithmetic_Functions_Adv_Mater_172015>.

Shao, Z. et al. "Memory phototransistors based on exponential-association photoelectric conversion law", Nat Commun 10, 1294, Published: Mar. 20, 2019. <https://www.nature.com/articles/s41467-019-09206-w>.

Chapinal, G. et al. "A 128×128 CMOS Image Sensor With Analog Memory for Synchronous Image Capture", Sensors Journal, IEEE. 2. 120-127. 10.1109/JSEN.2002.1000252, published May 2002. <https://www.researchgate.net/publication/3430989_A_128_x_128_CMOS_Image_Sensor_With_Analog_Memory_for_Synchronous_Image_Capture.

International-Type Search Report of Australian Patent Application No. 2020904109, dated Feb. 22, 2021, 21 pages, Australian Patent Office.

Extended European Search Report of corresponding European Patent Application No. EP21890395.3, dated Sep. 19, 2024, 12 pages, European Patent Office.

Zhou, Feichi, et al., "Optoelectronic resistive random access memory for neuromorphic vision sensors," Nature Nanotechnology, Jul. 15, 2019, 8 pages, vol. 14, Springer Nature, doi: https://doi.org/10.1038/s41565-019-0501-3.

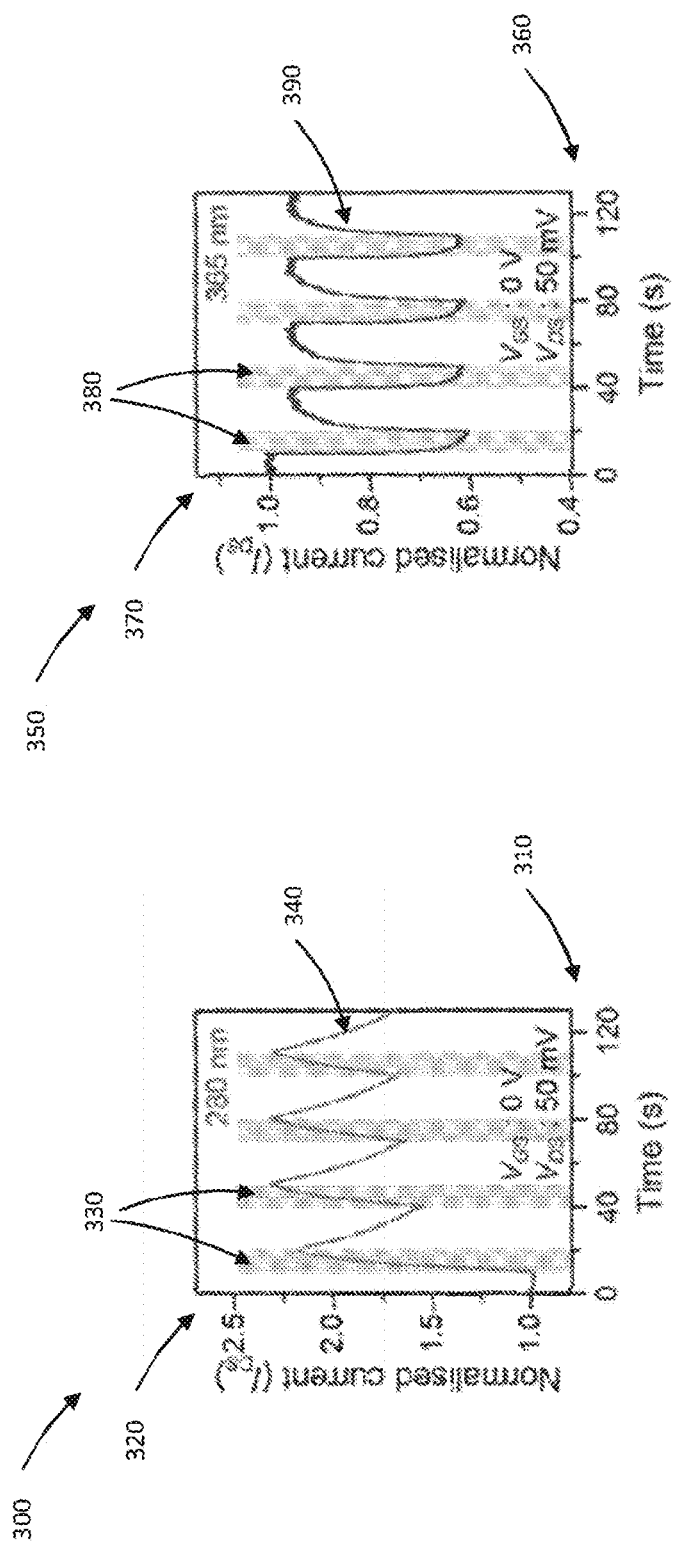

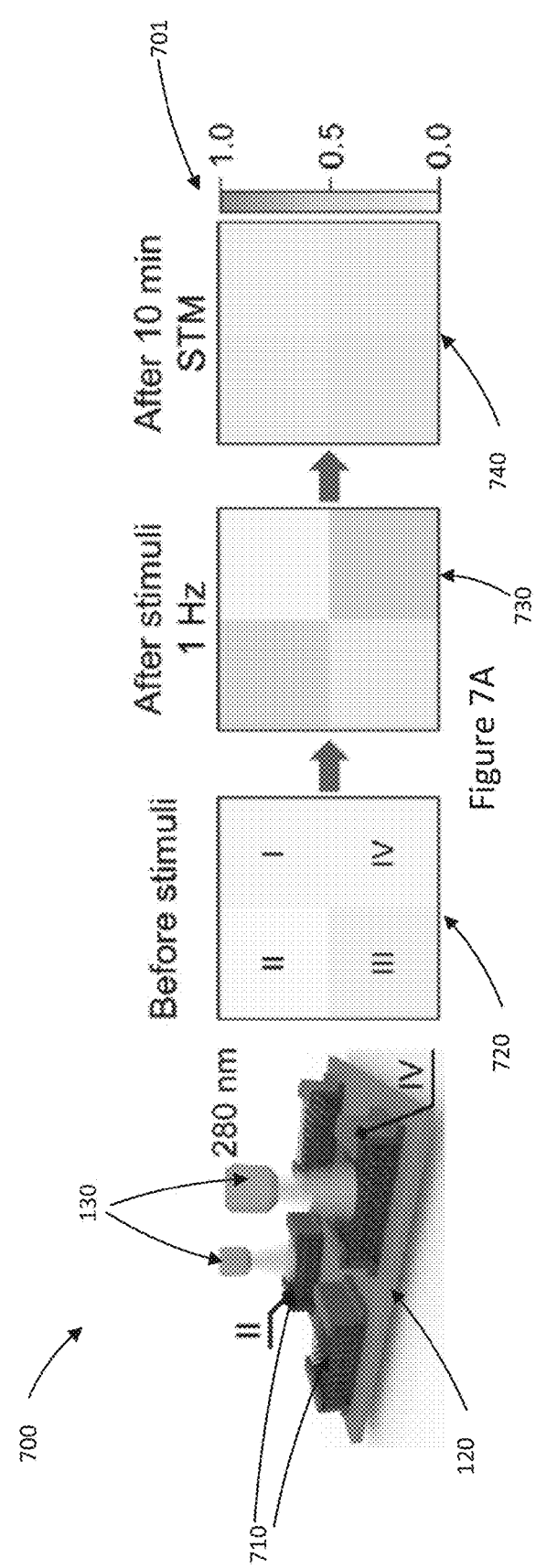
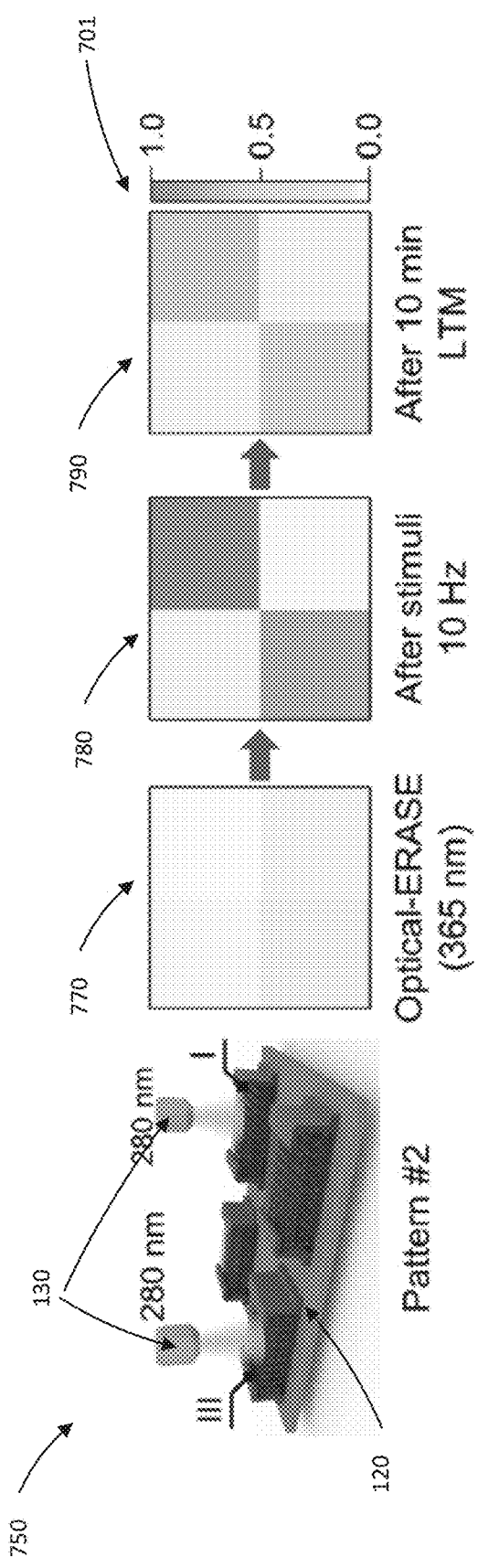
Figure 7A
Figure 7B

SYSTEMS AND METHODS FOR DATA STORAGE AND PROCESSING

CROSS-REFERENCE TO RELATED APPLICATIONS

This Application is a continuation of International Patent Application No. PCT/AU2021/051331, filed on Nov. 10, 2021, which claims priority to AU Application No. 2020904109, filed on Nov. 10, 2020, the entire contents of each of which are hereby incorporated by reference.

BACKGROUND

Field

Embodiments generally relate to systems and methods for data storage and processing. In particular, embodiments relate to systems and methods for optoelectronic data storage and processing.

Description of Related Art

Processes for capturing, storing and processing images are used in a number of industries and fields. In many cases, it is advantageous for the image capture, storage and processing to occur quickly. However, known processes often require transferring images between an image capture device such as a camera to a separate processing device such as a computer before image processing can occur. This introduces delays and inefficiencies which can negatively impact many computer vision applications which require rapid and close to real-time processing, including neuro-robotics, human-machine interaction technologies and bionic systems.

It is desired to address or ameliorate one or more shortcomings or disadvantages associated with prior systems and methods for data storage and processing, or to at least provide a useful alternative thereto.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each of the appended claims.

SUMMARY

Some embodiments relate to an imaging device for capturing image data, the imaging device comprising: an optical sensor responsive to electromagnetic radiation, wherein the sensor exhibits a photo-memory effect causing the sensor to act as a short-term memory device; an exposure control device configured to adopt a first mode and a second mode, wherein in the first mode the exposure control device causes electromagnetic radiation to reach the sensor and in the second mode the exposure control device restricts electromagnetic radiation from reaching the sensor; a processor configured to receive sensor data from the sensor, and to cause the exposure control device to selectively adopt the first mode and the second mode; and a long term memory device accessible to the processor, wherein the processor is configured to read executable instructions from the long term memory and to write sensor data to the long term memory; wherein data stored in the sensor acting as a short-term memory device is erasable by exposing the photo-sensor to electromagnetic radiation.

In some embodiments, the optical sensor is responsive to one or more of ultraviolet light, visible light, and infrared light.

According to some embodiments, the optical sensor comprises a two-dimensional semiconductor. In some embodiments, the two-dimensional semiconductor comprises at least one of an elemental material, transitional metal oxide, or transition metal chalcogenide. In some embodiments, the two-dimensional semiconductor comprises black phosphorous.

According to some embodiments, the optical sensor comprises an array of optical sensor devices.

In some embodiments, the sensor device is configured to exhibit a reference conductance in the absence of electromagnetic radiation, and to exhibit a wavelength dependent increase and/or decrease in conductance when exposed to electromagnetic radiation. In some embodiments, the conductance of the sensor device is configured to return to the reference conductance not less than 1 second after exposure to the electromagnetic radiation has ceased. In some embodiments, the conductance of the sensor device is configured to return to the reference conductance not less than 1 minute after exposure to the electromagnetic radiation has ceased.

According to some embodiments, the conductance of the sensor device increases when the sensor device is exposed to electromagnetic radiation of a first wavelength, and decreases when the sensor device is exposed to electromagnetic radiation of a second wavelength. According to some embodiments, the first wavelength is between 250 and 315 nm, and the second wavelength is between 315 and 400 nm.

In some embodiments, the processor is configured to read data stored on the sensor device by applying a voltage to the sensor device.

According to some embodiments, the exposure control device comprises at least one of a shutter configured to block electromagnetic radiation or a filter configured to filter out at least some wavelengths of electromagnetic radiation.

According to some embodiments, the exposure control device comprises at least one source of electromagnetic radiation.

Some embodiments relate to a method of capturing image data, the method comprising: operating an exposure control device to adopt a first mode, wherein in the first mode the exposure control device causes an optical sensor responsive to electromagnetic radiation to be exposed to first electromagnetic radiation, wherein the sensor exhibits a photo-memory effect causing the sensor to act as a short-term memory device; upon determining that a threshold period of time has elapsed, operating the exposure control device to adopt a second mode, wherein in the second mode the exposure control device causes the sensor to be blocked from electromagnetic radiation; reading data captured by the sensor based on the exposure; and recording the read data to a long term memory device.

In some embodiments, the method is performed by the device of some other described embodiments.

Some embodiments further comprise erasing the read data from the sensor acting as a short term memory device by operating the exposure control device to adopt a third mode, wherein in the third mode the exposure control device causes the sensor to be exposed to second electromagnetic radiation.

In some embodiments, the exposure control device comprises a shutter or filter, wherein adopting a first mode comprises opening the shutter or filter, and wherein adopting the second mode comprises closing the shutter or filter.

In some embodiments, the exposure control device comprises a source of electromagnetic radiation, wherein adopting a first mode comprises switching on the source of electromagnetic radiation, and wherein adopting the second mode comprises switching off the source of electromagnetic radiation.

According to some embodiments, reading data captured by the sensor comprises applying a voltage to the sensor. Some embodiments relate to a method of training a neural network, the method comprising: receiving at least one training image and a label related to the at least one training image; capturing image data by performing the method of some other embodiments, wherein the first electromagnetic radiation is generated based on the at least one training image; and determining an output based on the read data and a weight matrix; comparing the read data with the label; and modifying the weight matrix based on the comparison.

Some embodiments further comprise repeating the method with the same at least one training image.

Some embodiments further comprise repeating the method with a further training image different to the at least one training image.

DESCRIPTION OF THE DRAWINGS

Embodiments are described in further detail below, by way of example and with reference to the accompanying drawings, in which:

FIGS. 3A and 3B show graphs illustrating write and erase functions of the optical sensor device of FIG. 2.

FIGS. 7A and 7B show the optical sensor device of FIG. 2 acting as short and long term memory.

DETAILED DESCRIPTION

Figure 1:
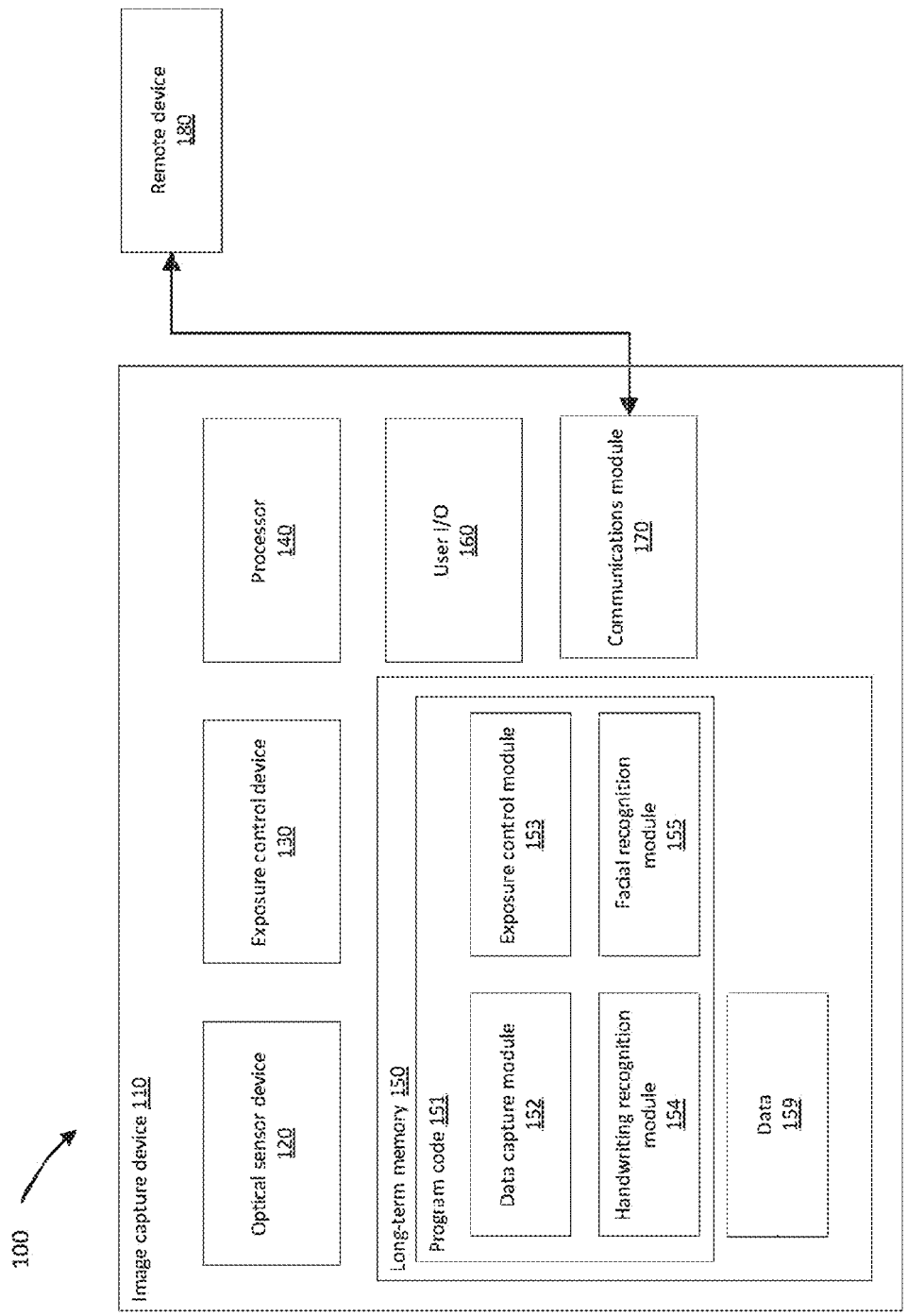
FIG. 1 shows a block diagram of a system for data storage and processing according to some embodiments.

Embodiments generally relate to systems and methods for data storage and processing. In particular, embodiments relate to systems and methods for optoelectronic data storage and processing.

Conventionally in image capture devices such as cameras, a photo-sensor is used to generate electrical signals based on exposure to light. The photo-sensor cannot store the captured image data, as conventional photo-sensors exhibit fast recovery of photo-response after light is switched off. To store the data, the electrical signals are read by an auxiliary circuit and data is stored to a separate electronic memory device in the form of "1"s and "0"s which are associated with the conductance states of the electronic memory. The two data states can be manipulated by way of write and erase procedures, where a write procedure causes a memory location to take on a "1" state and an erase procedure causes the device to take on a "0" state. These write and erase procedures are performed electronically by changing or switching the conductance of the memory locations in the memory device. However, the use of electronically programmable memory devices can result in processing delays. They generate large amounts of redundant data which requires significant computing to extract meaningful information, and also require a large amount of data storage. These requirements result in increased data latency and high power consumption. Furthermore, electrical signals induce electronic noise in circuits, which can affect the performance and accuracy of data processing and neuromorphic processes.

In contrast, described embodiments relate to systems and methods for data storage and processing that make use of a sensor exhibiting a fully light controlled memory effect, that allows for data to be both written and erased optically by way of exposure to electromagnetic radiation such as light. This sensor can therefore be controlled without relying on the application of alternating polarity electric signals. This is made possible by using a sensor element exhibiting a persistent photocurrent in the absence of exposure to electromagnetic radiation such as light, having slower recovery of photo-response than conventional photo-sensors. Furthermore, these embodiments allow for in-pixel data storage and processing, meaning processing can occur within the optical sensor capturing the data, without requiring the data to be transferred to an electronic memory device. The sensor can therefore act as both a light sensor and a memory device. This may allow for faster data processing speeds due to high bandwidth, low parasitic crosstalk and ultralow power consumption as well as high scalability. This may allow for processes such as neuromorphic pre-processing and image recognition, visual memory, wavelength selective multi-bit programming, and in-pixel image pre-processing, for example. These processes may be applied to industries including automation, security and surveillance, brain-machine interface and bionics, among others.

FIG. 1 shows a block diagram of a system 100 for capturing, storing and processing image data according to some embodiments.

System 100 comprises an imaging device, being image capture device 110. Image capture device 110 may comprise a camera or scanner device in some embodiments. According to some embodiments, image capture device 110 may be configured to act as a neuromorphic imaging device that may be used within photonic neuromorphic circuits and artificial visual systems, for example.

Device 110 includes an optical sensor device 120, which may be configured to also act as a short term memory device, as described in further detail below. Optical sensor device 120 may comprise at least one semiconductor in some embodiments. According to some embodiments, optical sensor device 120 may comprise an array of semiconductors acting as pixels for capturing an array of image data.

Optical sensor device 120 may be sensitive to electromagnetic radiation. According to some embodiments, optical sensor device 120 may be sensitive to particular wavelengths of electromagnetic radiation. For example, in some embodiments, optical sensor device 120 may be sensitive to light. In some embodiments, optical sensor device 120 may be sensitive to visible light. Optical sensor device 120 may be sensitive to light with wavelengths between 300 nm and 800 nm, for example. In some embodiments, optical sensor device 120 may be sensitive to one or more of ultraviolet light, visible light, and/or infrared light. Optical sensor device 120 may be sensitive to light with wavelengths between 280 nm and 1300 nm, for example.

In some embodiments, optical sensor 120 may comprise at least one two-dimensional semiconductor or semiconductor array. In some embodiments, optical sensor 120 may comprise at least one two-dimensional semiconductor or semiconductor array comprising an elemental material, such as black phosphorous, for example. In some embodiments, optical sensor 120 may comprise at least one two-dimensional semiconductor or semiconductor array comprising a transitional metal oxide, such as molybdenum trioxide, for example. In some embodiments, optical sensor 120 may comprise at least one two-dimensional semiconductor or semiconductor array comprising a transition metal chalcogenide, such as tin sulphide (SnS) or molybdenum disulphide (MoS2), for example.

According to some embodiments, the semiconductor may be the two-dimensional black phosphorous semiconductor described in International Application No. PCT/AU2019/050662, the entirety of which is herein incorporated by reference.

According to some embodiments, the optical sensor device 120 may exhibit a reference conductance when not exposed to electromagnetic radiation such as light, and may exhibit wavelength dependent increase and decrease in conductance when exposed to particular wavelengths of electromagnetic radiation. The conductance exhibited by the optical sensor device 120 may increase when exposed to electromagnetic radiation of a first wavelength, and decrease when exposed to electromagnetic radiation of a second wavelength. For example, according to some embodiments, the conductance exhibited by optical sensor device 120 may increase when exposed to light with a wavelength in the range of 250-315 nm, and may decrease when exposed to light with a wavelength in the range of 315-400 nm. Write and erase procedures can therefore be performed on optical sensor device 120 by exposing optical sensor device 120 to particular electromagnetic radiation wavelengths, and without using electronic write or erase procedures.

According to some embodiments, after exposure to the electromagnetic radiation has stopped, optical sensor device 120 may exhibit optical memory, with conductance persisting in the absence of electromagnetic radiation, allowing optical sensor device 120 to act as a short-term memory device. According to some embodiments, optical sensor device 120 may exhibit a photocurrent for over 1 second after exposure to electromagnetic radiation has stopped. According to some embodiments, optical sensor device 120 may exhibit a photocurrent for over 1 minute after exposure to electromagnetic radiation has stopped. According to some embodiments, optical sensor device 120 may exhibit a photocurrent for over 10 minutes after exposure to electromagnetic radiation has stopped. According to some embodiments, optical sensor device 120 may exhibit a photocurrent for over 1 hour after exposure to electromagnetic radiation has stopped. According to some embodiments, optical sensor device 120 may exhibit a photocurrent for over 5 hours after exposure to electromagnetic radiation has stopped.

Image capture device 110 may also comprise an exposure control device 130, to control the exposure of optical sensor device 120 to light or to particular wavelengths of electromagnetic radiation. According to some embodiments, exposure control device 130 may comprise at least one of a shutter, filter or lens. According to some embodiments, exposure control device 130 may comprise one or more light sources. For example, exposure control device 130 may comprise a first light source producing light having a first wavelength that increases the conductance of or otherwise produces a write effect on optical sensor device 120, and a second light source producing light having a second wavelength that decreases the conductance of or otherwise produces an erase effect on optical sensor device 120. Exposure control device 130 may be located proximate to optical sensor device 120.

Image capture device 110 further comprises a processor 140, which may comprise one or more microprocessors, central processing units (CPUs), application specific instruction set processors (ASIPs), or other processor capable of reading and executing instruction code. According to some embodiments, processor 140 may be located on a single chip with optical sensor device 120. According to some embodiments, processor 140 may also be located on a single chip with long-term memory 150. Processor 140 may be configured to control the operation of exposure control device 130 to write and erase data from optical sensor device 120. Processor 140 may also be configured to read data from optical sensor device 120. According to some embodiments, reading data from optical sensor device 120 may comprise applying a voltage to optical sensor device 120 and determining a conductance or resistance of the device based on the applied voltage.

Image capture device 110 may further comprise long-term memory 150 storing program code 151 and data 159. Processor 140 may be configured to access long-term memory 150, to execute instructions stored in program code 151 and to read from and write to data 159. According to some embodiments, processor 140 may be configured to read data from optical sensor device 120 and write the data to data 159 of long-term memory 150 for long term storage. Long-term memory 150 may comprise one or more volatile or non-volatile memory types, such as RAM, ROM, EEPROM, or flash, for example.

Program code 151 of long-term memory 150 may comprise a plurality of code modules executable by processor 140 to cause image capture device 110 to capture, store and process image data. For example, program code 151 may include a data capture module 152, an exposure control module 153, a handwriting recognition module 154 and a facial recognition module 155.

When processor 140 executes data capture module 152, processor 140 may be caused to apply a voltage to optical sensor device 120, determine at least one conductance of optical sensor device 120, and to write data to data 159 based on the at least one conductance.

When processor 140 executes exposure control module 153, processor 140 may be caused to control the functions of exposure control device 130. Where exposure control device 130 comprises a shutter, the control may include opening and/or closing the shutter, for example. Where exposure control device 130 comprises a light source, the control may include turning the light source on and off.

Figure 8:
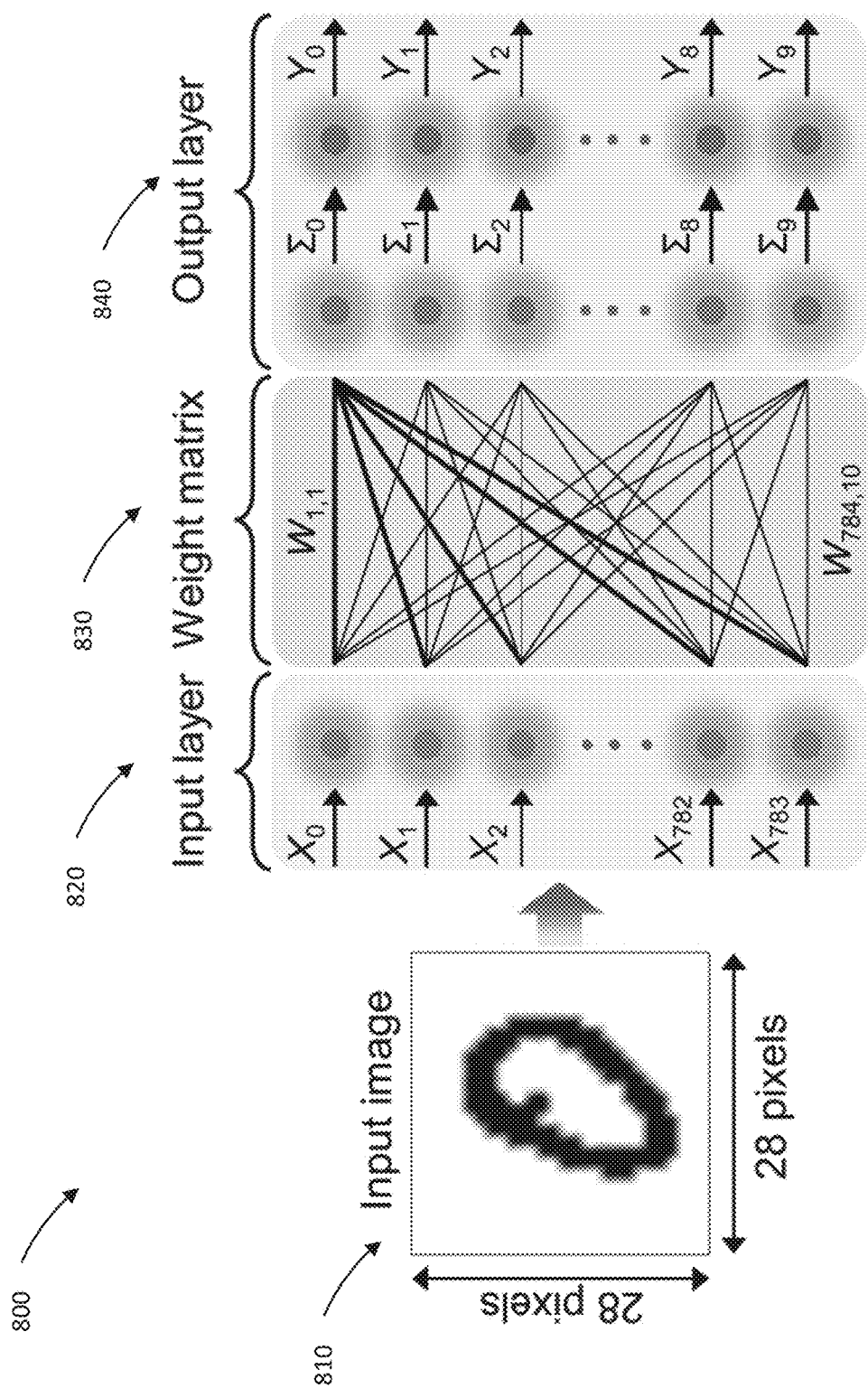
FIG. 8 shows a method of training the optical sensor device of FIG. 2 for handwriting recognition.
Figure 9:
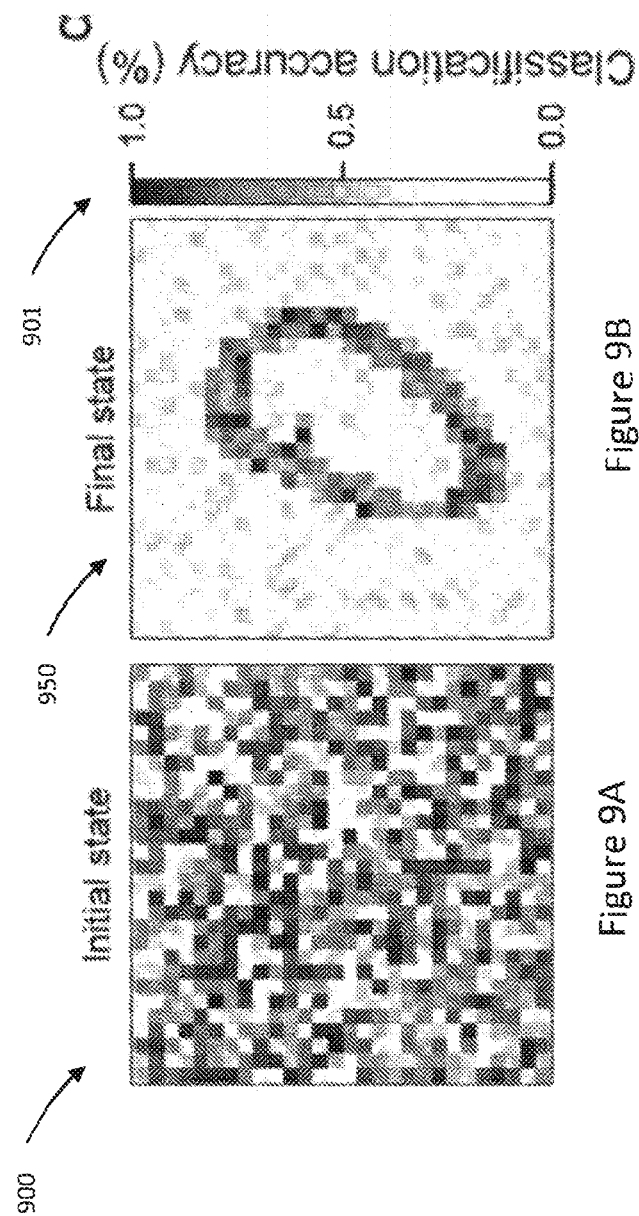
FIGS. 9A and 9B show the results of optical sensor device of FIG. 2 after the method of FIG. 8.

When processor 140 executes handwriting recognition module 154, processor 140 may be caused to control cause optical sensor device 120 to act as a neural network, and to train optical sensor device 120 to recognize images of handwritten characters, as described below in further detail with reference to FIGS. 8 and 9.

When processor 140 executes facial recognition module 155, processor 140 may be caused to control cause optical sensor device 120 to act as a neural network, and to train optical sensor device 120 to recognize images of faces, as described below in further detail with reference to FIGS. 10 and 11.

Image capture device 110 further includes user I/O 160, which may include one or more forms of user input and/or output devices, such as one or more of a screen, keyboard, mouse, touch screen, microphone, speaker, or other device that allows information to be delivered to or received from a user. Image capture device 110 may also include communications module 170. Communications module 170 may be configured to communicate with one or more external computing devices or computing systems, via a wired or wireless communication protocol. For example, communications module 170 may facilitate communication via at least one of Wi-Fi, Bluetooth, Ethernet, USB, or via a cellular network in some embodiments. In the illustrated embodiment, communications module 170 is in communication with a remote device 180, which may be a computer in some embodiments.

Figure 2:
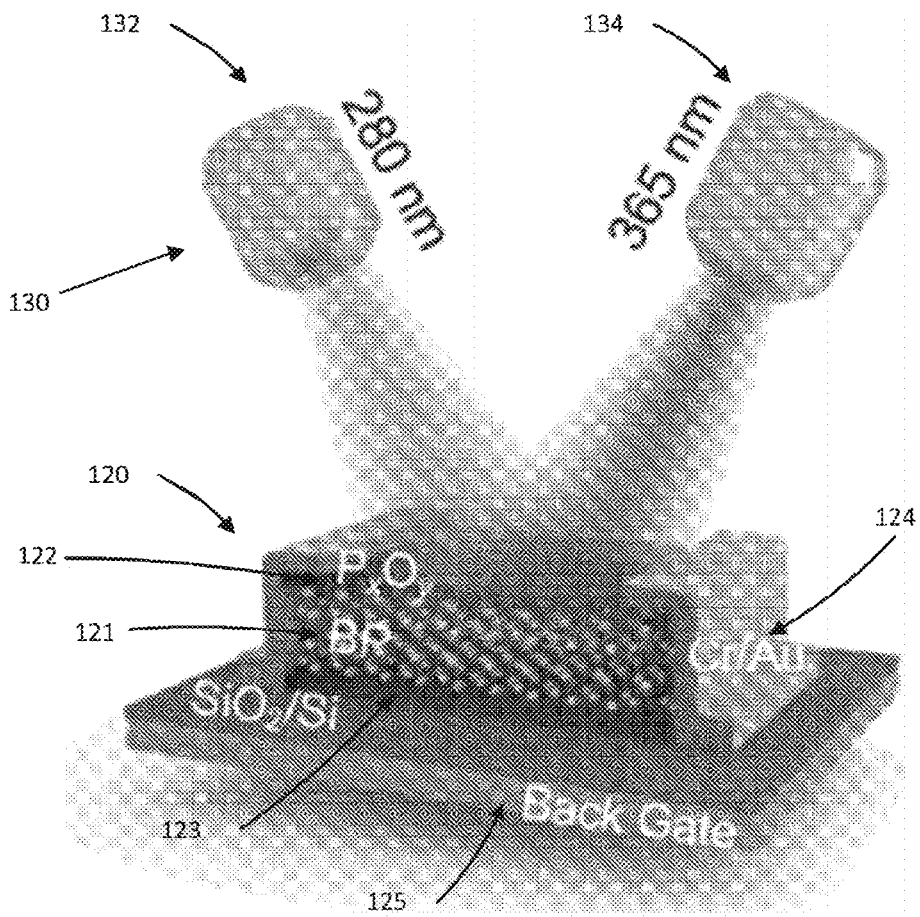
FIG. 2 shows a detailed view of an optical sensor device of FIG. 1.

FIG. 2 shows a detailed view of optical sensor device 120 with exposure control device 130. In the illustrated embodiments, exposure control device 130 comprises two light sources 132 and 134, with light source 132 producing light with a 280 nm wavelength and light source 134 producing light with a 365 nm wavelength. However, as described above, exposure control device 130 may comprise a different mechanism for selectively exposing optical sensor device 120 to light or other electromagnetic radiation. For example, exposure control device 130 may comprise a first filter for filtering electromagnetic radiation of a first wavelength, a second filter for filtering electromagnetic radiation of a second wavelength and a shutter for blocking all electromagnetic radiation. Processor 140 manipulating exposure control device 130 may therefore be able to cause only electromagnetic radiation of the first wavelength, only electromagnetic radiation of the second wavelength, or no electromagnetic radiation to be received by optical sensor device 120.

Optical sensor device 120 may comprise an optoelectronic memory device fabricated in a phototransistor configuration as described in International Application No. PCT/AU2019/050662. In the embodiment illustrated in FIG. 2, optical sensor device 120 comprises a sensing element 121, which may be a black phosphorous layer comprising multiple vertically stacked layers of black phosphorous. According to some embodiments, sensing element 121 may be comprise an atomically thin semiconductor material. According to some embodiments, the thickness of the semiconductor material may be in the range of 2 nm to 50 nm. According to some embodiments, this may be produced by a process of mechanical exfoliation and dry transfer.

By exploiting oxidation induced defects on the layers of black phosphorous, light tenability can be achieved, causing the layers to generate a unique persistent photo-response under the illumination of particular wavelengths of light or electromagnetic radiation. As described above, the conductance exhibited by the black phosphorous layers may increase when exposed to light with a wavelength in the range of 250-315 nm, and may decrease when exposed to light with a wavelength in the range of 315-400 nm. This effect can allow for multi-bit programming and erasing functions, image pre-processing and neuromorphic image recognition functions to be performed. According to some embodiments, while black phosphorous may exhibit an anisotropic photo-response, the above-described wavelength specific increases and decreases in conductance may be exhibited regardless of the crystal orientation of the black phosphorous.

According to some embodiments, optical sensor device 120 may further comprise a passivation layer 122, which may be a phosphorous oxide ($P_xO_y$) layer in some embodiments. The native phosphorous oxide layer may form on top of black phosphorous substrate 121 due to the exposure of substrate 121 with oxygen, and may act as a self-passivation layer for the black phosphorous to protect it from further corrosion. Furthermore, layer 122 may induce localized trap sites for charge carriers, causing unusual negative photoconductivity under optical excitation, allowing for the unique band selective photo-response under different wavelengths of electromagnetic radiation as described above. According to some embodiments, passivation layer 122 may form on both the top and bottom of black phosphorous substrate 121. According to some embodiments, layer 122 may be between 1 and 5 nm thick.

Optical sensor device 120 further comprises an electrically insulating substrate 123, which may be a $SiO_2/Si$ layer 123.

Optical sensor device 120 further comprises electrodes 124, which allow a voltage to be applied between them and to pass through layer 121. According to some embodiments, the electrodes may each comprise two layers, such as a chromium layer and a gold layer, for example.

Layers 121, 122 and 123, and electrodes 124 may be positioned on a back gate 125. Back gate 125 may be configured to act as a third electrode, and may allow optical sensor device 120 to perform gate-assisted write and erase functions, as described in further detail below with reference to FIGS. 6A and 6B.

Figure 13:
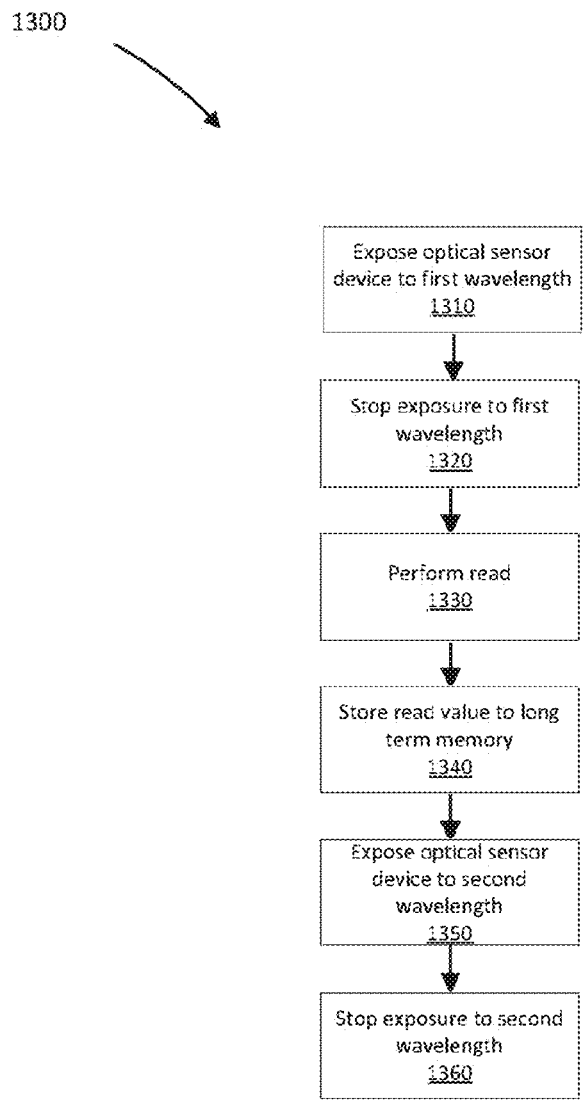
FIG. 13 shows a flowchart illustrating a method of capturing image data using the imaging device of FIG. 1.

FIG. 13 shows a method of capturing image data using image capture device 110.

At step 1310, processor 140 executing exposure control module 153 is caused to control exposure control device 130 in order to cause exposure control device 130 to adopt a exposure mode, in which exposure control device 130 causes optical sensor device 120 to be exposed to first electromagnetic radiation. Where exposure control device 130 comprises a shutter or filter, adopting the exposure mode may comprise opening the shutter or filter. Where exposure control device 130 comprises a source of electromagnetic radiation such as a light 132, adopting the exposure mode may comprise switching on the source of electromagnetic radiation. The electromagnetic radiation may be of a first predetermined wavelength, which may cause an increase in conductance of optical sensor device 120 or otherwise cause data to be written to optical sensor device 120.

At step 1320, processor 140 executing exposure control module 153 is caused to control exposure control device 130 in order to cause exposure control device 130 to adopt a protected mode, in which optical sensor device 120 is blocked from or otherwise no longer exposed to the first electromagnetic radiation. According to some embodiments, processor 140 may execute step 1320 after a predetermined period of time has elapsed after performing step 1310. Where exposure control device 130 comprises a shutter or filter, adopting the protected mode may comprise closing the shutter or filter. Where exposure control device 130 comprises a source of electromagnetic radiation such as a light 132, adopting the protected mode may comprise switching off the source of electromagnetic radiation.

At step 1330, processor 140 executing data capture module 152 is caused to read reading data captured by optical sensor device 120. According to some embodiments, processor 140 may be caused to apply a voltage to optical sensor device 120 in order to determine a conductance or resistance of the optical sensor device 120 based on the applied voltage. According to some embodiments, the measured conductance or resistance may be compared with one or more predetermined threshold values to determine a value stored by optical sensor device 120.

At step 1340, processor 140 executing data capture module 152 may be caused to store the value read from optical sensor device to data 159 of long term memory 150.

In some embodiments, processor 140 may then be configured to perform steps 1350 and 1360 to erase the data from optical sensor device 120.

At step 1350, processor 140 executing exposure control module 153 is caused to control exposure control device 130 in order to cause exposure control device 130 to adopt a exposure mode, in which exposure control device 130 causes optical sensor device 120 to be exposed to second electromagnetic radiation. Where exposure control device 130 comprises a shutter or filter, adopting the exposure mode may comprise opening the shutter or filter. Where exposure control device 130 comprises a source of electromagnetic radiation such as a light 132, adopting the exposure mode may comprise switching on the source of electromagnetic radiation. The electromagnetic radiation may be of a second predetermined wavelength, which may cause a decrease in conductance of optical sensor device 120 or otherwise cause data to be erased from optical sensor device 120.

At step 1360, processor 140 executing exposure control module 153 is caused to control exposure control device 130 in order to cause exposure control device 130 to adopt a protected mode, in which optical sensor device 120 is blocked from or otherwise no longer exposed to the second electromagnetic radiation. According to some embodiments, processor 140 may execute step 1320 after a predetermined period of time has elapsed after performing step 1310. Where exposure control device 130 comprises a shutter or filter, adopting the protected mode may comprise closing the shutter or filter. Where exposure control device 130 comprises a source of electromagnetic radiation such as a light 132, adopting the protected mode may comprise switching off the source of electromagnetic radiation.

FIGS. 3A and 3B show graphs illustrating the optical modulation and memory function of an optical sensor device 120 under two illumination wavelengths. FIG. 3A relates to a scenario in which sensor device 120 was exposed to a 280 nm light source such as light source 132, while FIG. 3B relates to a scenario in which sensor device 120 was exposed to a 365 nm light source such as light source 134. In each case, a voltage of 50 mV was applied to sensor device 120 via electrodes 124 (the drain-source voltage $V_{DS}$), while the voltage at back gate 125 (the gate-source voltage $V_{GS}$) was held at 0 V.

Turning to FIG. 3A, the illustrated graph 300 has an X-axis 310 displaying time in seconds, and a Y-axis 320 displaying the normalized current $I_{DS}$. Bars 330 correspond to times at which sensor device 120 was exposed to the 280 nm light source 132, and line 340 illustrates the current measured in sensor device 120 at each point in time, corresponding to the normalized transient photo-response of sensor device 120 to the illumination pulses illustrated by bars 330. As sensor device 120 is exposed to the light, a positive photocurrent is generated resulting in an increase in the measured current. This is due to the trapping of photo-excited charge carriers at localized trap sites induced by the surface oxidation of the sensing element 121, as described above with reference to FIG. 2. When the exposure is stopped, the current gradually decreases over time, due to the release of the photo-excited charge carriers.

Turning to FIG. 3B, the illustrated graph 350 has an X-axis 360 displaying time in seconds, and a Y-axis 370 displaying the normalized current $I_{DS}$. Bars 380 correspond to times at which sensor device 120 was exposed to the 365 nm light source 134, and line 390 illustrates the current measured in sensor device 120 at each point in time, corresponding to the normalized transient photo-response of sensor device 120 to the illumination pulses illustrated by bars 380. As sensor device 120 is exposed to the light, a negative photocurrent is generated resulting in a reduction to the measured current. This is due to the release of photo-excited charge carriers at localized trap sites induced by the surface oxidation of the sensing element 121, as described above with reference to FIG. 2. When the exposure is stopped, the current gradually increases over time, due to the trapping of further photo-excited charge carriers.

Figure 4A:
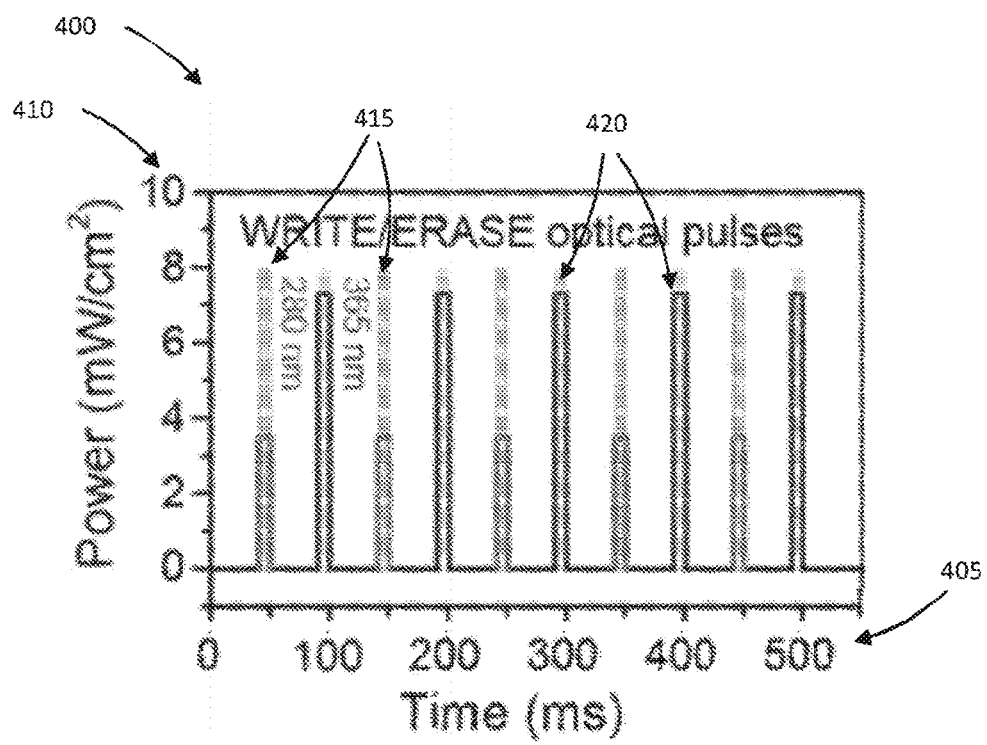
FIGS. 4A, 4B and 4C illustrating write, erase and read functions of the optical sensor device of FIG. 2.
Figure 4B:
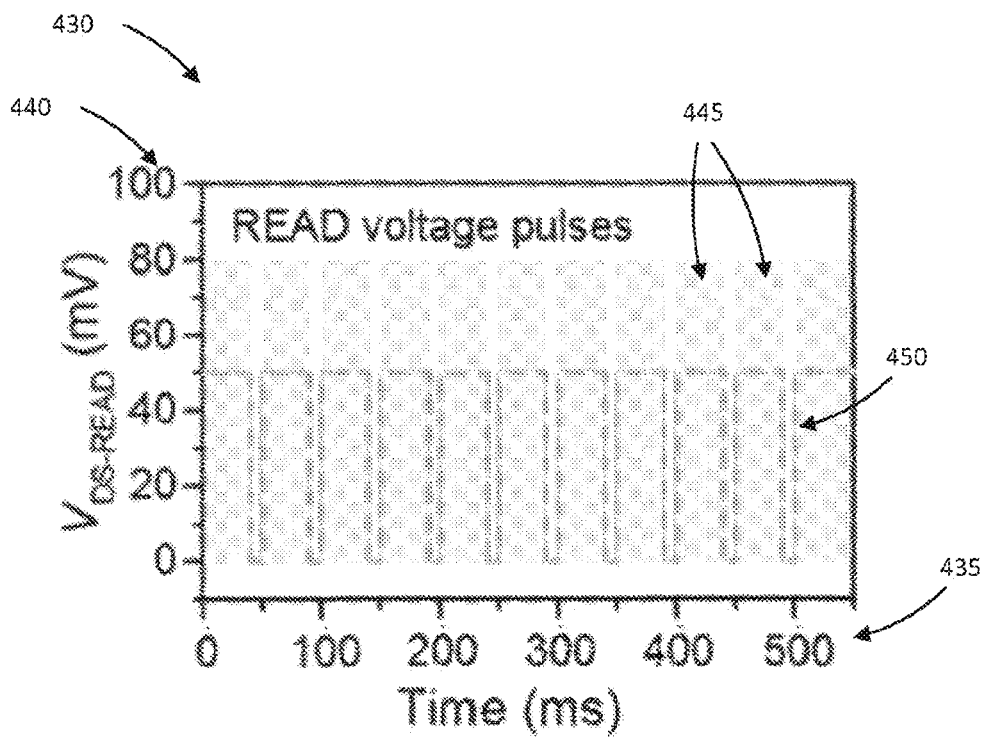
Figure 4C:
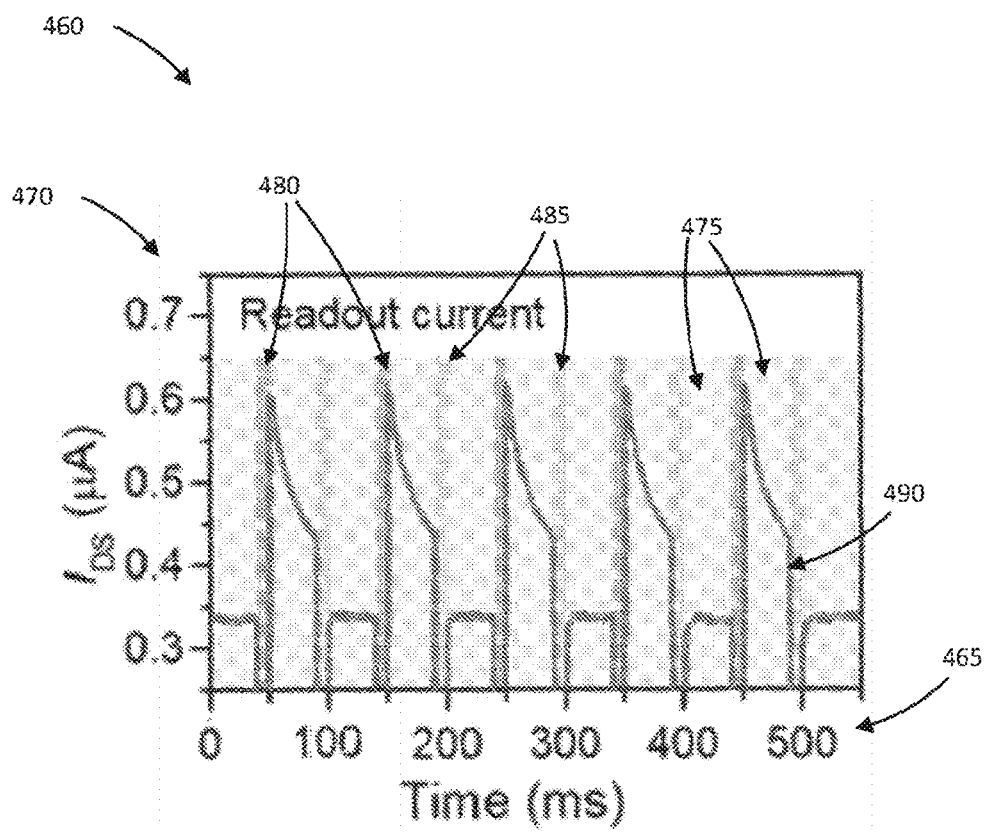

FIGS. 4A, 4B and 4C show graphs illustrating the dynamic memory access operation of optical sensor device 120 in an all-optical memory mode, taking advantage of the phenomenon illustrated by FIGS. 3A and 3B. In the all-optical memory mode, both write and erase functions can be achieved by exposing optical sensor device 120 to electromagnetic radiation in the form of optical pulses, which may be done by processor 140 controlling exposure control device 130. Read functions are performed by applying voltage pulses to electrodes 124, but no voltage is applied to gate 125.

Turning to FIG. 4A, the illustrated graph 400 has an X-axis 405 displaying time in milliseconds, and a Y-axis 410 displaying the power in mW/cm² of illumination supplied to optical sensor device 120 by lights 132 and 134. Bars 415 correspond to times at which sensor device 120 was exposed to the 280 nm light source 132, and bars 420 correspond to times at which sensor device 120 was exposed to the 365 nm light source 134.

FIG. 4B shows a graph 430 having an X-axis 435 displaying time in milliseconds, and a Y-axis 440 displaying the voltage in mV applied to electrodes 124 for the purpose of reading data from optical sensor device 120. Bars 445 correspond to times at which the voltage pulses were applied, and line 450 corresponds to the voltage applied over time, being 50 mV during a read pulse and 0V between pulses.

FIG. 4C shows a graph 460 having an X-axis 465 displaying time in milliseconds, and a Y-axis 470 displaying the normalized current $I_{DS}$ produced by optical sensor device 120. Bars 475 correspond to times at which the voltage pulses were applied. Bars 480 correspond to times at which sensor device 120 was exposed to 280 nm light source 132, and bars 485 correspond to times at which sensor device 120 was exposed to 365 nm light source 134. Line 490 illustrates the current measured in sensor device 120 at each point in time, corresponding to the normalized transient photo-response of sensor device 120 to the illumination pulses illustrated by bars 480 and 485. When sensor device 120 is exposed to the 280 nm light, a positive photo-current is generated resulting in an increase in the measured current. When sensor device 120 is exposed to the 365 nm light, a negative photo-current is generated resulting in a decrease in the measured current.

In reference to FIGS. 4A, 4B and 4C, it is shown that initially at 0 milliseconds, a 40 ms "read" voltage pulse of 50 mV is applied to quantify the "off" state of the current of optical sensor device 120 with no exposure to light. As shown, the current is measured to be around 0.33 µA. To program optical sensor device 120, at 40 ms optical sensor device 120 is exposed to a "write" light pulse of 280 nm with a power density of 3.5 mW/cm$^2$ for 10 ms, while no voltage is applied. Subsequently, another "read" voltage pulse is applied to measure the now "on" state current of optical sensor device 120. As the "write" pulse has generated photo-excited carriers, the current shows an increase, being at around 0.61 µA. During the "read" pulse, the current slowly decays over time.

The relatively slow recovery of the current after exposure to the light sources can be attributed to the charge carrier recombination through oxidation induced in localized trap centers within the optical sensor device 120, as described above with reference to FIG. 2. As such, optical sensor device 120 shows a persistent photo-current even after illumination is removed, and this residue photo-current persists even after a long retention time. According to some embodiments, optical sensor device 120 may retain some photo-current for over 5.5 hours.

To reset optical sensor device 120, at 90 ms optical sensor device 120 is exposed to an "erase" light pulse of 365 nm with a power density of 7.3 mW/cm$^2$ for 10 ms, while no voltage is applied. A comparatively higher power density "erase" pulse may be used compared to the "write" pulse to compensate for the magnitude difference in photo-current. Subsequently, another "read" voltage pulse is applied to measure the now "off" state current of optical sensor device 120. As the "erase" pulse has induces a negative photo-current, the current shows a decrease to its initial "off" state of around 0.33 µA.

Further "write", "read" and "erase" actions are performed as illustrated. According to some embodiments, optical sensor device 120 may be capable of performing at least 2000 "write" and "erase" cycles without any deterioration in cyclic endurance or stability, indicating repeatability and reproducibility of such a device.

As described above, optical sensor device 120 may be able to deliver ultrafast operation speeds, as it is triggered with photonic signals. This allows sensor device 120 to be used in applications such as in-pixel image processing and facial recognition to realize efficient hardware for artificial intelligence, as described in further detail below. In contrast, previous optoelectronic memories have shown comparatively lower switching speeds (in milliseconds to seconds) than known electronic memories (which have switching speeds in the range of nanoseconds to sub-microseconds). This is because in electronic memories, fast charge injection through localized switching paths or floating gate charge storage render high switching speed. On the other hand, material dependent dynamics of photo-excited charge carries and associated mechanisms such as trapping/de-trapping can be responsible for the slow operational speeds in previous optoelectronic memories.

In contrast, optical sensor device 120 may exhibit switching speed with optical pulses of around 10 ms duration, being more than two orders of magnitude higher than some previous known optoelectronic memories.

Figure 5A:
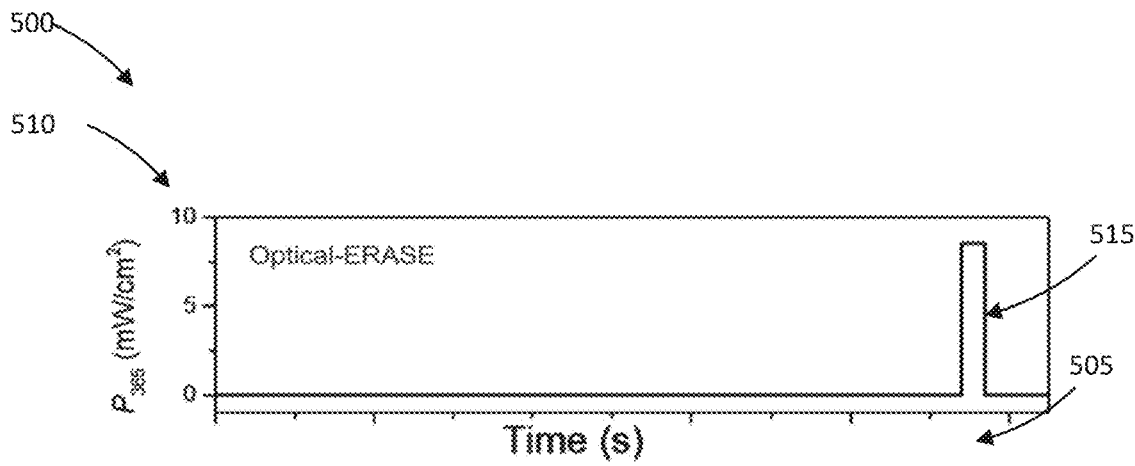
FIGS. 5A, 5B and 5C show graphs illustrating the optical sensor device of FIG. 2 acting as multi-bit memory.
Figure 5B:
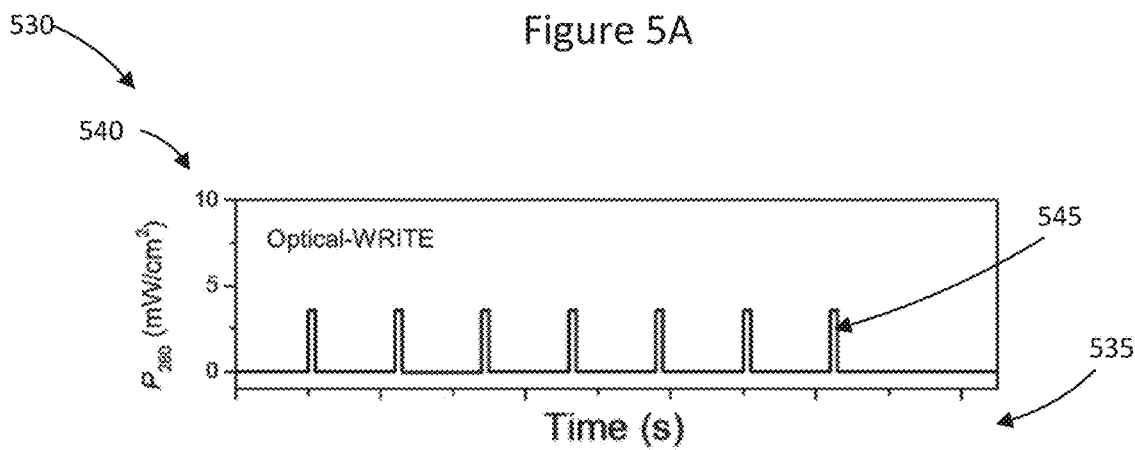
Figure 5C:
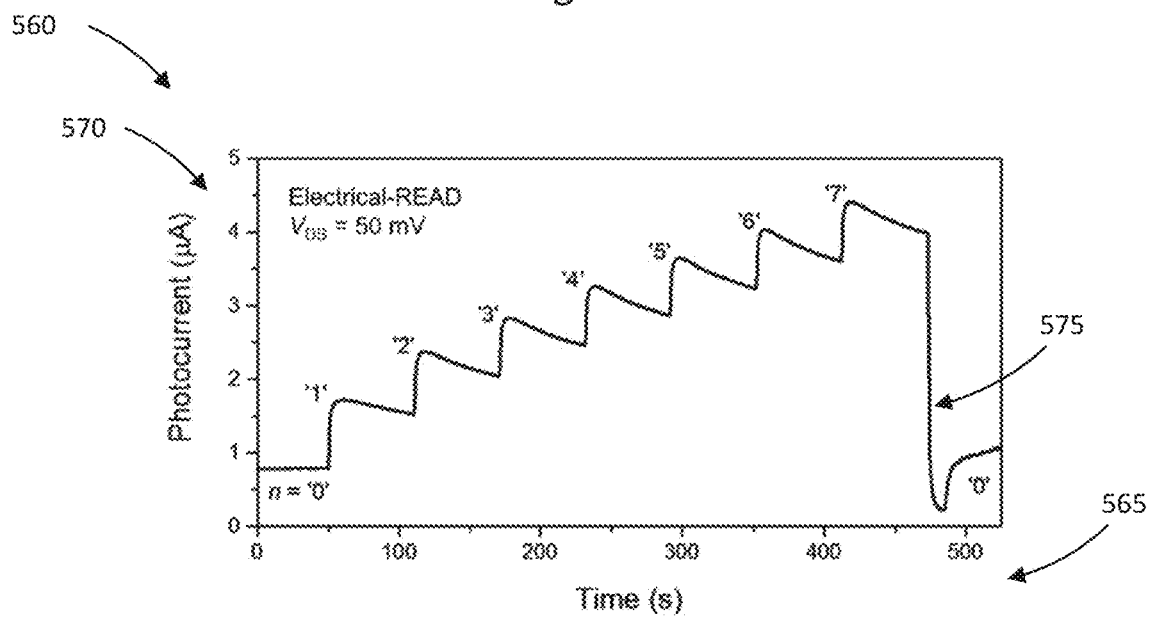

Due to the persistent photo-current, slow recovery and long retention time, optical sensor device 120 may be used for multi-bit data programming and storage. FIGS. 5A, 5B and 5C shows graphs illustrating optical sensor device 120 being used for writing, erasing and reading 8-bit data.

FIG. 5A shows a graph 500 having an X-axis 505 displaying time in seconds, and a Y-axis 510 displaying the power in mW/cm$^2$ of illumination supplied to optical sensor device 120 by a light source that induces an "erase" action. For example, the illumination may be a 365 nm light pulse emitted by a light source such as light source 134. Line 515 shows the power of illumination supplied to optical sensor device 120 by light 134 over time, showing a single 15 second pulse of 8.5 mW/cm$^2$ of illumination at around 460 seconds.

FIG. 5B shows a graph 530 having an X-axis 535 displaying time in seconds, and a Y-axis 540 displaying the power in mW/cm$^2$ of illumination supplied to optical sensor device 120 by a light source that induces a "write" action. For example, the illumination may be a 280 nm light pulse emitted by a light source such as light source 132. Line 545 shows the power of illumination supplied to optical sensor device 120 by light 132 over time, showing a seven 5 second pulse of 3.5 mW/cm$^2$ of illumination with a period of 55 seconds.

FIG. 5C shows a graph 560 having an X-axis 565 displaying time in seconds, and a Y-axis 570 displaying the current in µA produced by optical sensor device 120 when exposed to the pulses of FIGS. 5A and 5B, as well as a voltage of 50 mV applied to electrodes 124. As shown, the multiple "write" pulses cause the current generated by sensor device 120 to increase in steps, until the "erase" pulse causes the current to drop below the reference current or "off" current exhibited by sensor device 120 when it is not exposed to any light sources. The current then recovers back to the reference or "off" current after termination of the "erase" pulse. This demonstrates optical sensor device 120 being able to adopt at least eight different memory states, which can be programmed and erased electronically. This allows optical memory device 120 to be used for optoelectronic in-memory computation and logic operations such as image processing and neuromorphic computation, as described in further detail below.

As well as being able to store and erase data purely optically, optical sensor device 120 may further be able to be used in a gate-assisted mode, where voltage can be applied to back gate 125 to perform further processing functions. In this case, optical sensor device 120 may operate in a three-terminal field effect transistor configuration, where illumination applied to optical sensor device 120 may be used to modulate the transfer characteristics.

Figure 6A:
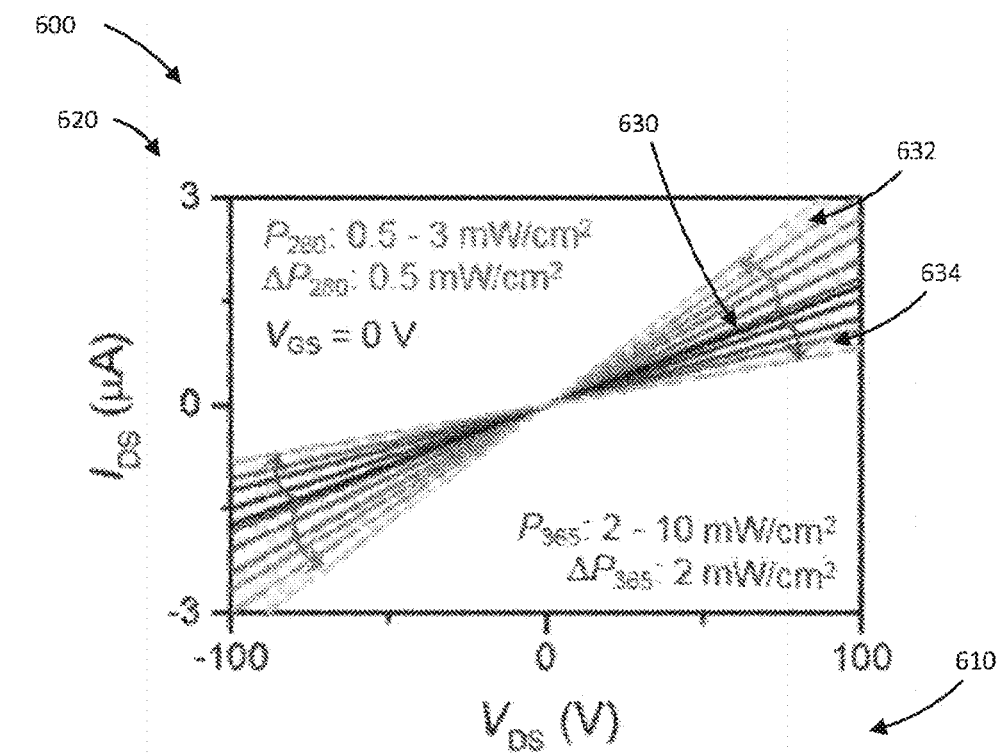
FIGS. 6A and 6B show transfer function of the optical sensor device of FIG. 2.
Figure 6B:
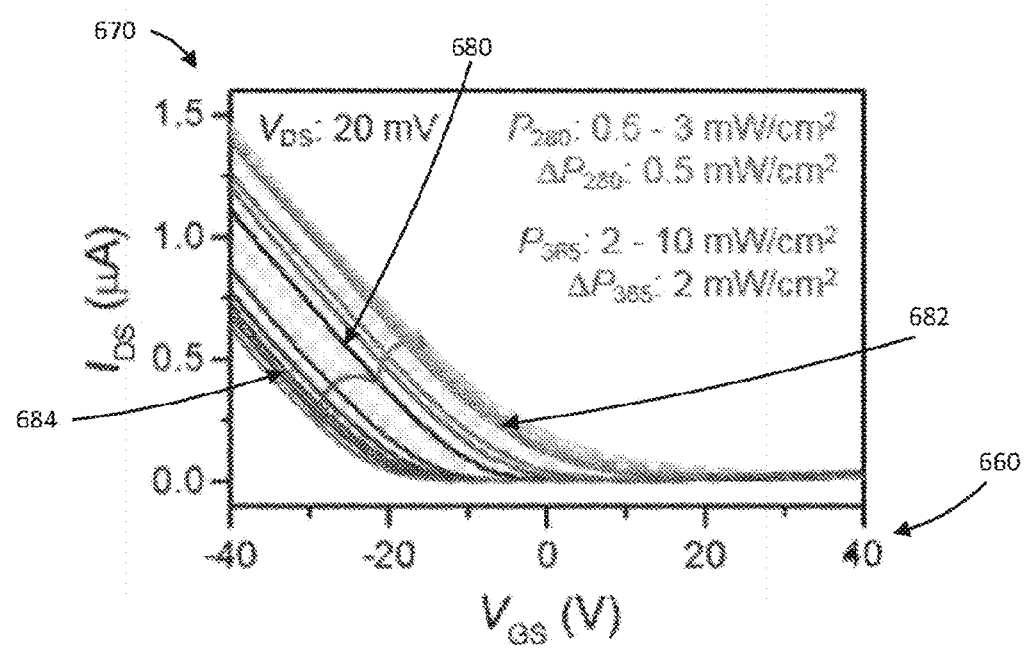

FIGS. 6A and 6B show example transfer characteristics of optical sensor device 120 acting in an optical mode, and a gate-assisted mode.

FIG. 6A shows a graph 600 showing example transfer characteristics of optical sensor device 120 acting in an optical-only mode, in which the voltage $V_{GS}$ at back gate 125 is 0V. X-axis 610 shows the voltage $V_{DS}$ applied to electrodes 124 in volts, while Y-axis 620 shows the output drain-source current profiles $I_{DS}$ exhibited by optical sensor device 120 in µA. Reference line 630 shows the current produced when optical sensor device 120 is not exposed to any illumination.

Lines 632 show the current produced by optical sensor device 120 under different power densities of 280 nm illumination. As shown in graph 600, under 280 nm illumination, $I_{DS}$ increases with respect to reference line 630 as the power density increases. Lines 634 show the current produced by optical sensor device 120 under different power densities of 365 nm illumination. As shown in graph 600, under 365 nm illumination $I_{DS}$ decreases proportionally with respect to reference line 630 as the power density increases.

FIG. 6B shows a graph 650 showing example transfer characteristics of optical sensor device 120 acting in a gate-assisted mode, in which the voltage $V_{GS}$ at back gate 125 is varied. X-axis 660 shows the gate voltage $V_{GS}$ applied to back gate 125, while Y-axis 670 shows the output drain-source current profiles $I_{DS}$ exhibited by optical sensor device 120 in μA. Reference line 680 shows the current produced when optical sensor device 120 is not exposed to any illumination.

Lines 682 show the current produced by optical sensor device 120 under different power densities of 280 nm illumination. Lines 684 show the current produced by optical sensor device 120 under different power densities of 365 nm illumination. The calculated carrier mobility increases and decreases after illumination with 280 nm and 365 nm wavelengths, respectively, compared to reference line 680. This increase in mobility under 280 nm illumination may be associated with the high energy of hot carriers gained under high energy excitation, while the mobility decreases under 365 nm illumination may be due to the carrier scattering by charged defects under low energy excitation, as described in further detail below. As such, the change in conductance of optical sensor device 120 regulated by optical signals under the influence of voltage applied to back gate 125 allows for programming and erasing capabilities by simply applying specified wavelengths, such as 280 nm and 365 nm wavelengths, respectively.

The transfer characteristics of optical sensor device 120 in gate-assisted mode demonstrate the power-dependent multi-level data programming and erasing operations that can be achieved with optical sensor device 120.

Further observing FIG. 6B, it can be clearly observed that the threshold voltages $V_{TH}$ of the transfer curves shifts during gate-assisted "write" and "erase" operations. This $V_{TH}$ shift is possibly due to the electrostatic screening by light induced charge trapping at the surface of layers 121 and 122 of or bottom of the layer 121/122/123 interface. As shown in graph 650, during the "write" operation, $V_{TH}$ steadily increases from +3.45 V to +27.35 V when the illumination power density of the 280 nm illumination pulses increases from 0.5 mW/cm2 to 3 mW/cm2. During the "erase" operation, $V_{TH}$ shifts from −4.8 V to −11.59 V as the power density of the 365 nm illumination pulses increase from 2 mW/cm2 to 10 mW/cm2. As such, in the gate-assisted configuration, a memory window is defined by the difference between the programming or "write" state $V_{TH}$ and the "erase" state $V_{TH}$. A maximum memory window of ~38.94 V may be observed for power densities of 3 mW/cm2 and 10 mW/cm2 during "write" and "erase" operations, for example.

According to some embodiments, optical sensor device 120 may show good endurance and cyclic repeatability of the optical "write" and "erase" operations in gate-assisted mode. For example, in some embodiments, optical sensor device 120 may exhibit no significant degradation in the memory window after more than 500 consecutive "write" and "erase" cycles in ambient conditions.

The described features, characteristics and properties of optical sensor device 120, image capture device 110 and system 100 may allow them to be configured to perform image processing functions such as image detection and memorization. Specifically, the deep trap-states assisted slow recovery and persistent photo-current exhibited by optical sensor device 120 allows for on-chip image-processing functions such as weak signal accumulation for real-time image enhancement. Furthermore, in-pixel storage can be used to achieve massive parallel computation.

According to some human memory models, external information received by human sensory organs is stored as a sensory memory for a very short time and then selected information is transferred from a temporary short-term memory (STM) to a permanent long-term memory (LTM). The STM corresponds to temporally weak neural plasticity which persists for a short duration, ranging from a few seconds to minutes. However, via the process of consolidation which involves repetitive stimuli and frequent rehearsals, the STM transforms into LTM, which corresponds to a temporally stronger neural plasticity lasting from several minutes to years. Using optical pulses as stimuli for optical sensor device 120 and varying their frequency by controlling exposure control device 130, these human memory behaviors including a transition of STM to LTM and optically tunable synaptic plasticity can be imitated by image capture device 110.

FIGS. 7A and 7B show examples of optical sensor device 120 exhibiting STM and LTM.

FIG. 7A shows a diagram 700 in which an optical sensor device 120 is caused to exhibit STM. The illustrated optical sensor device 120 is a 2×2 pixel chip, comprising four pixels I, II, III and IV. Each pixel comprises layers 121, 122 and 123 as well as electrodes 124, all sharing a single back gate 125. Exposure control device 130, which may be two light sources 132 in some embodiments, is caused to illuminate two pixels with a series of "write" illumination pulses, which may be 280 nm pulses in some embodiments. In the illustrated embodiment, pixels II and IV are illuminated with 100 consecutive short optical pulses with pulse width of 50 ms and a power density of 3 mW/cm2 at 1 Hz.

Images 720, 730 and 740 shows the current of each pixel 710 measured at various times. For comparison, the current of each pixel is scaled between 0 and 1 as shown in key 701, with 0 corresponding to the minimum measured current, being around 0.95 μA, and 1 corresponding to the maximum measured current, being around 3.93 μA.

Image 720 shows the current of each pixel 710 measured before the illumination pulses are delivered. The current of each pixel 710 is relatively low.

Image 730 shows the current of each pixel 710 measured within 0.5 seconds of the illumination pulses being delivered. Pixels II and IV show a relatively high current compares to pixels I and III, corresponding to the illumination pulses they have received.

Image 740 shows the current of each pixel 710 measured 10 minutes after the illumination pulses delivered. The current of each pixel 710 has returned to a similar level as that exhibited by pixels 710 before receiving the illumination pulses. This corresponds to a STM effect.

FIG. 7B shows a diagram 750 in which an optical sensor device 120 is caused to exhibit LTM. The illustrated optical sensor device 120 is the same 2×2 pixel chip shown in FIG. 7A. Exposure control device 130, which may be two light sources 132 in some embodiments, is caused to illuminate two pixels with a series of "write" illumination pulses, which may be 280 nm pulses in some embodiments. In the illustrated embodiment, pixels I and III are illuminated with 100 consecutive short optical pulses with pulse width of 50 ms and a power density of 3 mW/cm2, this time at 10 Hz.

Images 770, 780 and 790 shows the current of each pixel 710 measured at various times. For comparison, the current of each pixel is scaled between 0 and 1 as shown in key 701, being the same scale used in FIG. 7A.

Image 770 shows the current of each pixel 710 measured before the illumination pulses are delivered, and after an erase has been performed. The current of each pixel 710 is relatively low.

Image 780 shows the current of each pixel 710 measured within 0.5 seconds of the illumination pulses being delivered. Pixels I and III show a relatively high current compares to pixels II and IV, corresponding to the illumination pulses they have received. The difference in current is even greater than that exhibited by the pixels as shown in image 730 of FIG. 7A.

Image 790 shows the current of each pixel 710 measured 10 minutes after the illumination pulses delivered. In this case, while the current of each pixel 710 has started returning to a similar level as that exhibited by pixels 710 before receiving the illumination pulses, the difference between the illuminated pixels I and III and the unilluminated pixels II and IV is still measurable. This corresponds to a LTM effect. The increase in conductance contrast within optical sensor device 120 at higher illumination frequencies highlights the capability of using image capture device 110 for in-pixel image enhancement and real-time data processing of the input visual information.

The described features, characteristics and properties of optical sensor device 120, image capture device 110 and system 100 may further allow them to be configured to perform machine learning functions. For example, FIG. 8 shows a method of training image capture device 110 to act as an optical neural network to perform handwriting recognition. In the illustrated embodiments, optical sensor device 120 acts as a neural network comprising an input layer 820, a weight matrix 830 and an output layer 840. In the illustrated embodiments, input layer 820 comprises 28×28 input neurons numbered $X_0$ to $X_{783}$, and output layer 840 comprises 10 output neurons numbered $Y_0$ to $Y_9$. Each input neuron may comprise a pixel 710. The input neurons are connected to the output neurons through weight matrix 830, which in the illustrated embodiment comprises 784×10 synaptic weights, with each input neuron being connected to each output neuron through an individual synaptic weight. Each synaptic weight is the conductance of the pixel 710, and depends on intensity or dosage of the light exposed onto the pixel 710.

Optical sensor device 120 is trained via a single-layer perceptron model performing supervised learning with a back-propagation algorithm, using a plurality of training images. For example, FIG. 8 shows an example 28×28 pixel input image 810, being a handwritten "0" digit. Each training image may be associated with a label value $k_n$. For example, the label $k_n$ associated with input image 810 may be the value "0". The input images may be obtained from a database such as the Modified National Institute of Standards and Technology (MNIST) dataset. According to some embodiments, between 10,000 and 100,000 training images may be used.

During training, each neuron in the input layer 820 receives stimulation corresponding to a pixel in the image 810 and is assigned to an input vector $X_m$. Input vector $X_m$ is then transformed to 10 output values $\Sigma_n$ of output layer 840 through weigh matrix 830 ($W_{m,n}$) to feed the output neurons $Y_0$ to $Y_9$. The values of $\Sigma_n$ are converted to an output vector $Y_n$ by a sigmoid activation function. For example, output vector $Y_n$ may be determined by calculating:

$$Y_n = f\left(\sum_n\right) = \frac{1}{1 + e^{-\Sigma_n}}$$

Next, the difference between the values of the output vector $Y_n$ and the label value $k_n$ associated with the input image is used to update the synaptic weights of weight matric 830 through a weight update method based on the backpropagation algorithm. Specifically, the sign of the weight change $sgn(\Delta W)$ is calculated using the difference between the output value $Y_n$ and each label value $k_n$ to determine whether the synaptic weight needs to increase or decrease, such that:

$$sgn(\Delta W) > 0 \text{ if } k_n \, Y_n > 0$$

$$sgn(\Delta W) < 0 \text{ if } k_n \, Y_n < 0$$

Where $sgn(\Delta W) > 0$, both the synaptic weight W and the device conductance G are increased. Conductance G refers to the real conductance value of optical sensor device 120, while synaptic weight W refers to the conductance value calculated by the neural network during recognition. Where $sgn(\Delta W) < 0$, both the synaptic weight W and the device conductance G are decreased.

During training, the calculation of synaptic weight includes both positive and negative values, while the conductance of optical sensor device 120 is always positive. To overcome this discrepancy, the synaptic weight W may be considered to be the difference of two conductance values, being $G_{m,n}$ and $G_{int}$, where $G_{int} = (G_{max} + G_{min})/2$. $G_{max}$ and $G_{min}$ may be calculated based on experimental data. According to some embodiments, only $G_{m,n}$ may be used to modify the synaptic weights W of the network, while Gint may be used purely as a scaling factor for normalization.

Once optical sensor device 120 is trained using the method described above, it can be used to label input images that were not part of the training dataset.

In one example, an optical sensor device 120 was trained using 60,000 images from the MNIST dataset. Sensor device 120 was then asked to label 10,000 test images which were not provided during network training, and the recognition accuracy was determined. FIGS. 9A and 9B shows mapping images of a representative input handwritten digit '0' before and after 25,000 training phases. FIG. 9A shows a heat map 900 showing the classification accuracy in an initial state before training, while FIG. 9B shows a heat map 950 showing classification accuracy in a final state after training. Key 901 shows how the areas of the heat maps correspond to classification accuracy as a percentage between 0% and 100%.

The recognition accuracy was calculated for different pulse widths (1, 20, 50, 100 and 300 ms) of optical stimuli applied to optical sensor device 120, and a maximum recognition accuracy of ~90% was achieved.

Figure 10:
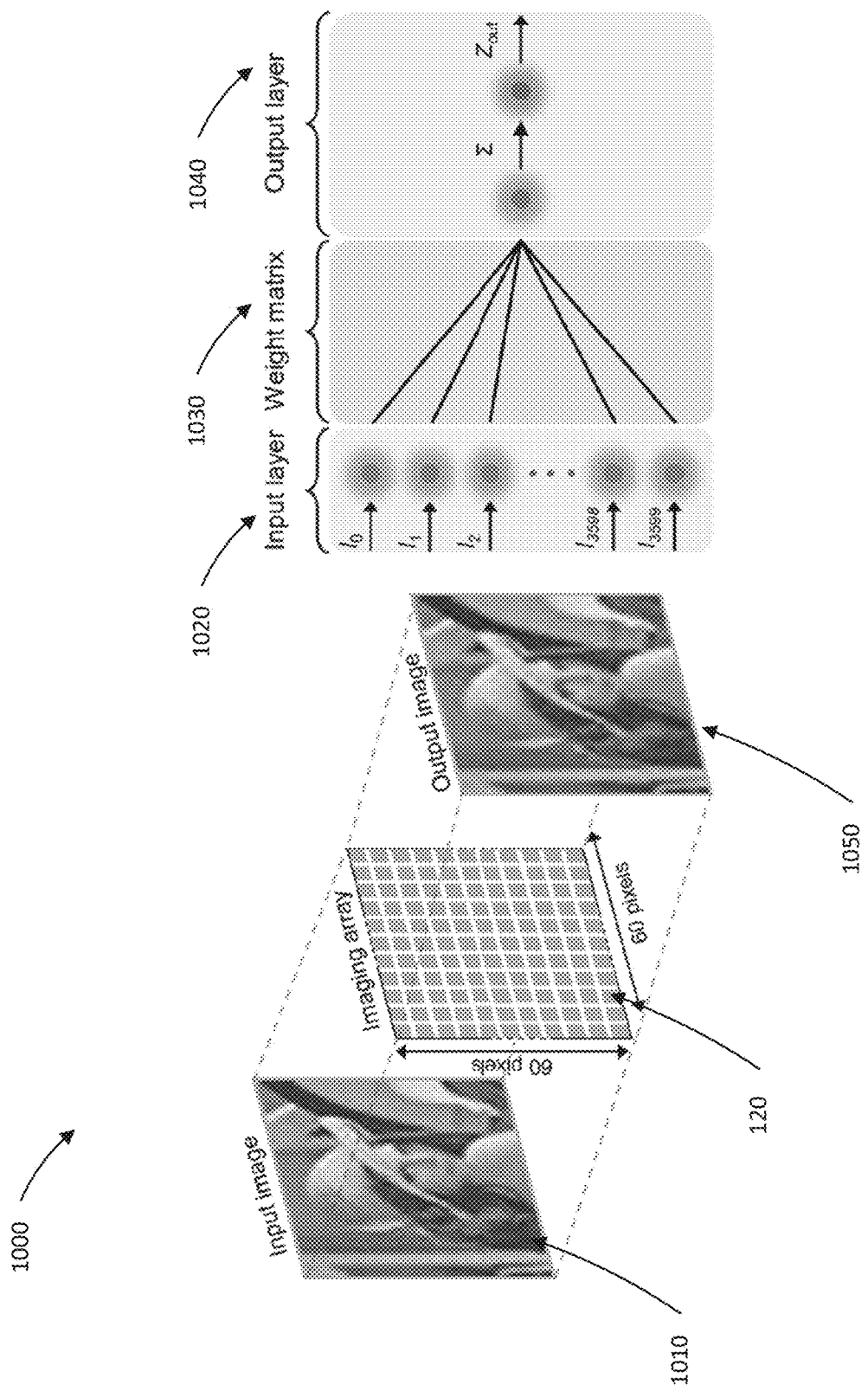
FIG. 10 shows a method of training the optical sensor device of FIG. 2 for facial recognition.

A similar process can be used to train image capture device 110 to act as an optical neural network to perform face recognition, as shown in FIG. 10. In the illustrated embodiments, optical sensor device 120 acts as a neural network comprising an input layer 1020, a weight matrix 1030 and an output layer 1040. In the illustrated embodiments, input layer 1020 comprises 60×60 input neurons numbered $I_0$ to $I_{3599}$, and output layer 1040 comprises a single output neuron $Z_{out}$. The input neurons are connected to the output neurons through weight matrix 1030, which in the illustrated embodiment comprises 3600×1 synaptic weights, with each input neuron being connected to the output neuron through an individual synaptic weight.

Optical sensor device 120 is trained via a single-layer perceptron model performing supervised learning with a back-propagation algorithm, using a plurality of training images. For example, FIG. 10 shows an example 60×60 greyscale pixel input image 1010 of a face.

During training, the weight matrix 1030 is updated based on the experimental conductance modification of optical sensor device 120 depending on whether an increase or decrease in the synaptic weight is required, as described above with reference to FIG. 8. The highest and lowest synaptic weights correspond to white and black pixels of the grayscale input image. In each learning epoch, 150 pixels are randomly selected to update the synaptic weight.

Figure 11:
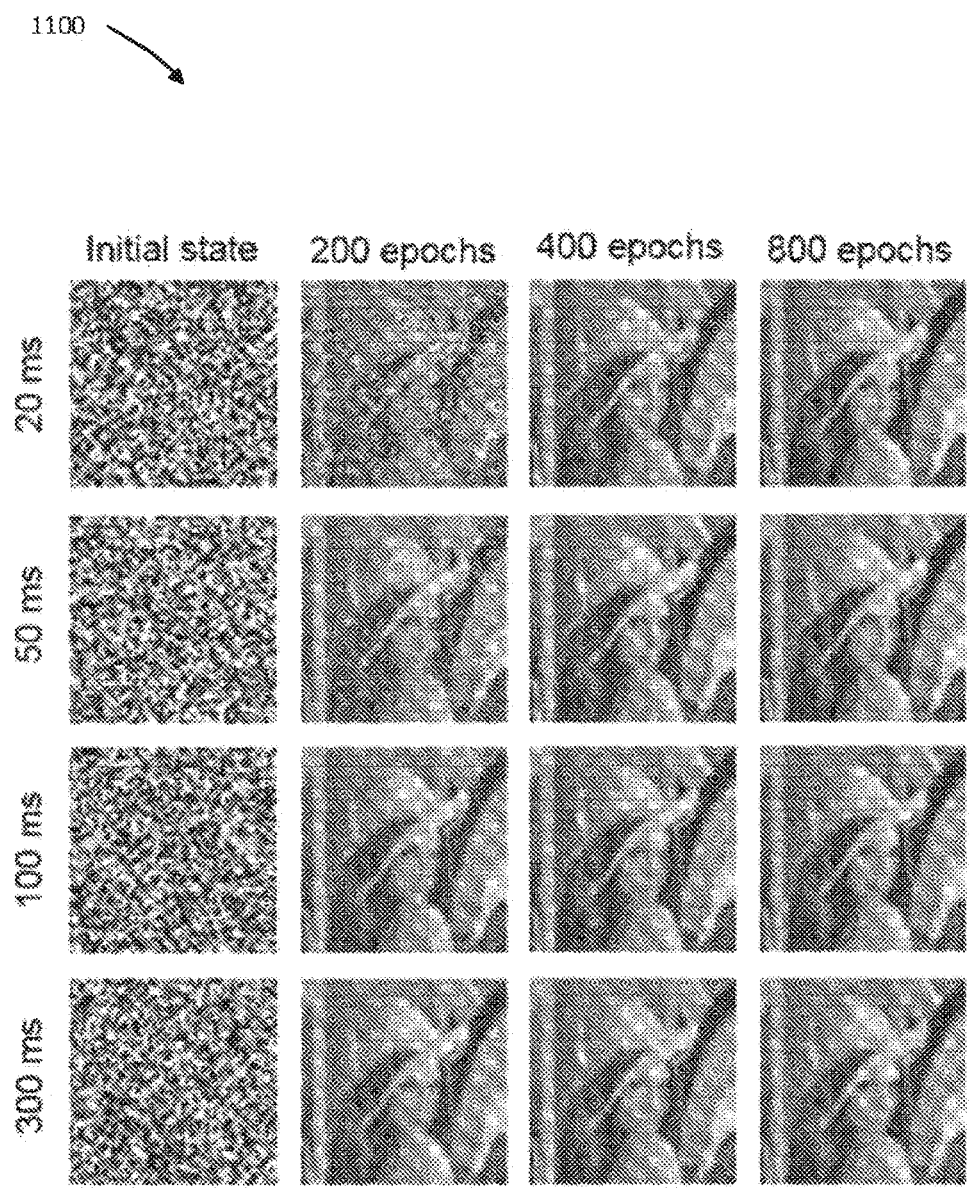
FIG. 11 shows the results of optical sensor device of FIG. 2 after the method of FIG. 10 is performed with varying parameters.
Figure 12:
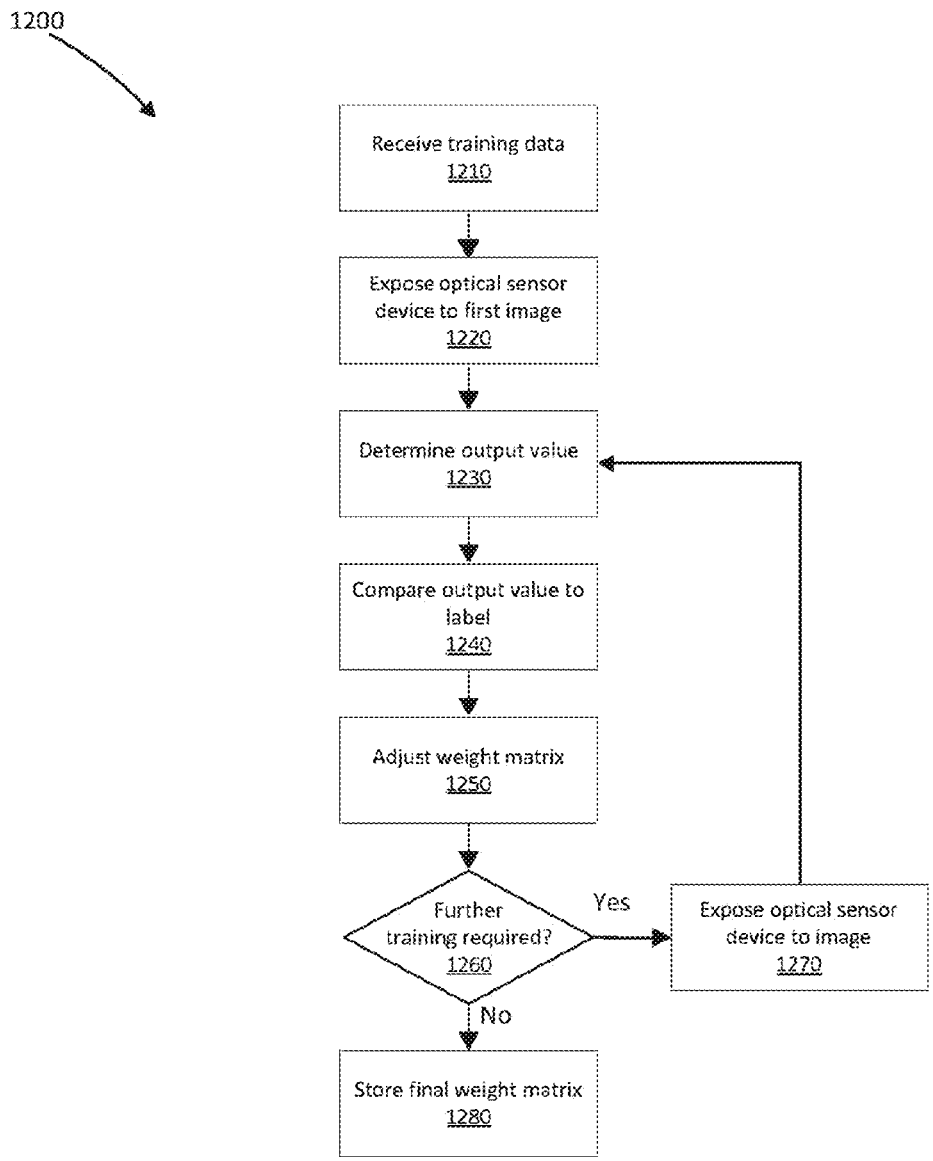
FIG. 12 shows a flowchart illustrating a method of training the system of FIG. 1 to perform image recognition according to some embodiments.

FIG. 11 shows a series of images 1100 showing the evolution of the image during the learning process at various stages. As depicted by FIG. 11, when optical sensor device 120 is trained with stimulation pulses of 20 milliseconds, sensor device 120 exhibits a relatively slower learning rate but a higher accuracy, as the facial details in the output image after 800 epochs are better at the final state than in the other datasets.

In contrast, training with the highest nonlinearity dataset using 300 millisecond pulses gives a faster learning rate, as the facial contour appear after relatively lesser training epochs, but gives the lowest accuracy with a less clear image at the final state. Using a Structural Similarity method to measure the difference between the learnt image and the input image, it was found that the final recognition accuracy of a minimal nonlinearity system is higher, at around 96% in 837 epochs for 1 millisecond pulses, than that of maximum nonlinearity system, which gave an accuracy of only 53.67% in 204 epochs for 300 millisecond pulses. This result can be associated with the higher rate of weight change in a nonlinearity system and the almost even distribution of synaptic weights in a minimal nonlinearity system. These results show that the inherent optical information detection, in-pixel processing and retention characteristics of the optical sensor device 120 make it possible to configure sensor device 120 to successfully imitate human visual memory.

FIG. 1200 shows a flowchart illustrating a method 1200 of training optical sensor device 120 to act as a neural network for performing image recognition. Method 1200 may be performed by processor 140 executing program code 130.

At step 1210, processor 140 executing handwriting recognition module 154 or facial recognition module 155 receives training data from remote device 180 via communications module 170. The training data may comprise training images or handwritten text, faces, or other images.

At step 1220, processor 140 executes exposure control module 153 to cause exposure control device 130 to expose optical sensor device 120 to a first image from the received training data for a predetermined period of time. This may be by causing one or more light sources corresponding to pixels of the image to illuminate one or more pixels 710 of optical sensor device 120.

At step 1230, processor 140 executing handwriting recognition module 154 or facial recognition module 155 determines an output value by applying a weight matrix stored in memory 150 to the output exhibited by sensor device 120 in response to the test image.

At step 1240, processor 140 executing handwriting recognition module 154 or facial recognition module 155 compares the output value with a label associated with the test image being processed.

At step 1250, processor 140 adjusts the weight matrix stored in memory 150 based on the outcome of the comparison performed at step 1240.

At step 1260, processor 140 determines whether further training is required. This may be by comparing the number of times that optical sensor device 120 has been exposed to the current test image, and by comparing the number of test images already used with the total number of training images available.

If processor 140 determines that further training is required, then at step 1270 processor 140 executes exposure control module 153 to again cause exposure control device 130 to expose optical sensor device 120 to an image for a predetermined period of time. The image may be the same as that already exposed to optical sensor device, or may be a new image. Processor 140 then proceeds to perform the method from step 1230.

If processor 140 determines that no further training is required, then at step 1280 processor 140 stores the final weight matrix 1280 in memory 150. This can then be used to process future images for the purposes of image recognition.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

What is claimed is:

1. An imaging device for capturing image data, the imaging device comprising:
    an optical sensor responsive to electromagnetic radiation, wherein the optical sensor exhibits a photo-memory effect causing the optical sensor to act as a short-term memory device;
    an exposure control device configured to adopt a first mode and a second mode, wherein in the first mode the exposure control device causes electromagnetic radiation to reach the optical sensor and in the second mode the exposure control device restricts electromagnetic radiation from reaching the optical sensor, and wherein exposure of the optical sensor to electromagnetic radiation of a first wavelength causes writing of data in the optical sensor;
    a processor configured to receive sensor data from the optical sensor, and to cause the exposure control device to selectively adopt the first mode and the second mode; and
    a long term memory device accessible to the processor, wherein the processor is configured to read executable instructions from the long term memory device and to write sensor data to the long term memory device,
    wherein the optical sensor is configured to exhibit a reference conductance in an absence of electromagnetic radiation, and to exhibit a wavelength dependent increase and/or decrease in conductance when exposed to electromagnetic radiation,
    wherein data stored in the optical sensor acting as the short-term memory device is erasable by exposing the optical sensor to electromagnetic radiation of a second wavelength, and
    wherein the writing and erasing of data are performed by the optical sensor without relying on electronic write or erase procedures.

2. The imaging device of claim 1, wherein the optical sensor is responsive to one or more of: ultraviolet light, visible light, and infrared light.

3. The imaging device of claim 1, wherein the optical sensor comprises a two-dimensional semiconductor.

4. The imaging device of claim 3, wherein the two-dimensional semiconductor comprises at least one of: an elemental material, transitional metal oxide, or transition metal chalcogenide.

5. The imaging device of claim 4, wherein the two-dimensional semiconductor comprises black phosphorous.

6. The imaging device of claim 5, wherein the two-dimensional semiconductor comprises multiple vertically stacked layers of black phosphorous including oxidation induced defects.

7. The imaging device of claim 6, wherein the two-dimensional semiconductor includes a phosphorous oxide layer on top of the black phosphorous.

8. The imaging device of claim 1, wherein the optical sensor comprises an array of optical sensor devices.

9. The imaging device of claim 1, wherein the conductance of the optical sensor is configured to: (i) return to the reference conductance not less than 1 second after exposure to the electromagnetic radiation has ceased; or (ii) return to the reference conductance not less than 1 minute after exposure to the electromagnetic radiation has ceased.

10. The imaging device of claim 1, wherein the optical sensor is configured such that the conductance increases when the optical sensor is exposed to electromagnetic radiation of the first wavelength, and decreases when the optical sensor is exposed to electromagnetic radiation of the second wavelength.

11. The imaging device of claim 10, wherein the first wavelength is between 250 and 315 nm, and the second wavelength is between 315 and 400 nm.

12. The imaging device of claim 1, wherein the processor is configured to read data stored on the optical sensor by applying a voltage to the optical sensor.

13. The imaging device of claim 1, wherein the exposure control device comprises at least one of a shutter configured to block electromagnetic radiation or a filter configured to filter out at least some wavelengths of electromagnetic radiation.

14. The imaging device of claim 1, wherein the exposure control device comprises at least one source of electromagnetic radiation.

15. A method of capturing image data, the method comprising:
operating an exposure control device to adopt a first mode, wherein in the first mode the exposure control device causes an optical sensor responsive to electromagnetic radiation to be exposed to electromagnetic radiation of a first wavelength causing writing of data in the optical sensor, wherein the optical sensor exhibits a photo-memory effect causing the optical sensor to act as a short-term memory device, and wherein the optical sensor is configured to exhibit a reference conductance in an absence of electromagnetic radiation, and to exhibit a wavelength dependent increase and/or decrease in conductance when exposed to electromagnetic radiation;
upon determining that a threshold period of time has elapsed, operating the exposure control device to adopt a second mode, wherein in the second mode the exposure control device causes the optical sensor to be blocked from electromagnetic radiation;
reading data captured by the optical sensor based on the exposure to the first electromagnetic radiation;
recording the read data to a long term memory device; and
erasing the read data from the optical sensor acting as a short term memory device by operating the exposure control device to adopt a third mode, wherein in the third mode the exposure control device causes the optical sensor to be exposed to electromagnetic radiation of a second wavelength,
wherein the writing and erasing of data are performed by the optical sensor without relying on electronic write or erase procedures.

16. The method of claim 15, wherein the method is performed by an imaging device, the imaging device comprising:
the optical sensor responsive to electromagnetic radiation, wherein the optical sensor exhibits the photo-memory effect causing the optical sensor to act as the short-term memory device;
the exposure control device;
a processor configured to receive sensor data from the optical sensor, and to cause the exposure control device to selectively adopt the first mode and the second mode; and
the long term memory device, the long term memory device accessible to the processor, wherein the processor is configured to read executable instructions from the long term memory device and to write sensor data to the long term memory device.

17. The method of claim 15, wherein the exposure control device comprises a shutter or filter, wherein adopting the first mode comprises opening the shutter or filter, and wherein adopting the second mode comprises closing the shutter or filter.

18. The method of claim 15, wherein the exposure control device comprises a source of electromagnetic radiation of the first wavelength, wherein adopting the first mode comprises switching on the source of electromagnetic radiation of the first wavelength, and wherein adopting the second mode comprises switching off the source of electromagnetic radiation of the first wavelength.

19. A method of training a neural network, the method comprising:
receiving at least one training image and a label related to the at least one training image;
capturing image data by:
operating an exposure control device to adopt a first mode, wherein in the first mode, the exposure control device causes an optical sensor responsive to electromagnetic radiation to be exposed to first electromagnetic radiation, and wherein:
the optical sensor is configured to exhibit a reference conductance in an absence of electromagnetic radiation, and to exhibit a wavelength dependent increase and/or decrease in conductance when exposed to electromagnetic radiation,
exposure of the optical sensor to the first electromagnetic radiation causes writing of data in the optical sensor, such that the optical sensor acts as a short-term memory device,
the writing of data in the optical sensor is performed without relying on an electronic write procedures, and
the first electromagnetic radiation is generated based on the at least one training image;
upon determining that a threshold period of time has elapsed, operating the exposure control device to adopt a second mode, wherein in the second mode the exposure control device causes the optical sensor to be blocked from electromagnetic radiation;
reading data captured by the optical sensor based on the exposure to the first electromagnetic radiation;
recording the read data to a long term memory device, thereby capturing image data;

determining an output based on the read data and a weight matrix;
comparing the read data with the label; and
modifying the weight matrix based on the comparison.

20. The method of claim 19, further comprising repeating the method with: (i) the same at least one training image; or (ii) a further training image different to the at least one training image.

* * * * *